United States Patent [19]
Alley, Jr. et al.

[11] Patent Number: 5,687,224
[45] Date of Patent: Nov. 11, 1997

[54] TELECOMMUNICATIONS CIRCUIT PROVISIONING AND ADMINISTRATION SYSTEM

[76] Inventors: Willard Kent Alley, Jr., 1601 S. 20th St., Blue Springs, Mo.; Sidney Clifton Kinsler, 219 Colleen, Gardner, Kans. 66030; Dale Alan Knapp, 3500 NE. 76th Ter., Gladstone, Mo. 64119

[21] Appl. No.: 506,941

[22] Filed: Jul. 26, 1995

[51] Int. Cl.$^6$ ................................................ H04M 3/42
[52] U.S. Cl. ..................... 379/201; 379/207; 379/230; 379/269
[58] Field of Search ................... 379/201, 196, 379/207, 221, 265, 230, 197, 269, 272, 242; 364/200; 370/351, 352, 353, 354, 355, 356, 218

[56] References Cited

U.S. PATENT DOCUMENTS

| | | | |
|---|---|---|---|
| 5,045,994 | 9/1991 | Belfer et al. | 364/200 |
| 5,347,564 | 9/1994 | Davis et al. | 379/219 |
| 5,359,596 | 10/1994 | Sadiq | 370/477 |
| 5,381,405 | 1/1995 | Daugherty et al. | 379/269 |
| 5,386,417 | 1/1995 | Daugherty et al. | 379/272 |
| 5,416,833 | 5/1995 | Harper et al. | 379/265 |
| 5,420,917 | 5/1995 | Guzman | 379/221 |
| 5,428,679 | 6/1995 | French | 379/201 |
| 5,491,742 | 2/1996 | Harper et al. | 379/201 |
| 5,519,772 | 5/1996 | Akman et al. | 379/201 |
| 5,528,677 | 6/1996 | Butler et al. | 379/196 |

OTHER PUBLICATIONS

"Quick Reference Guide", CAMS/RIDE (Undated).
"Using CAMS/RIDE", Student Handbook Centel CAMS/RIDE Training Program, pp. 1–34, Level 1–125, and Level 2 –1–29, (Undated).
"TTRKS", PY87BDC252.001, VLS 1988, (Undated).

*Primary Examiner*—Krista Zele
*Assistant Examiner*—Scott Wolinsky
*Attorney, Agent, or Firm*—Harley R. Ball; Michael J. Setter; Jed W. Caven

[57] ABSTRACT

A telecommunications circuit provisioning and administration system includes an access request management component which receives access service requests for a plurality of different types of telecommunications circuits, processes the access service requests, and produces provisioning data packets containing information relating to the requested telecommunications circuits. An interface is connected to the access request management component for transmitting information to and from the access request management component. The interface is capable of providing communication between mainframe computer systems and midrange distributed systems. A circuit administration component is connected to the interface and receives the provisioning data packets from the access request management component. A processor in the circuit administration component processes the information contained in the provisioning data packets and generates order confirmation messages containing information relating to the status of the requested telecommunications service orders. These confirmation messages are communicated to the access request management component through the interface. The circuit administration component is also capable of producing automated circuit layout records for the telecommunications circuit orders contained in the provisioning data packets.

44 Claims, 5 Drawing Sheets

TELECOMMUNICATIONS CIRCUIT PROVISIONING AND ADMINISTRATION SYSTEM

FIELD OF THE INVENTION

The present invention relates to telecommunications systems, and more particularly, to telecommunications circuit provisioning systems.

BACKGROUND OF THE INVENTION

In the telecommunications industry, telecommunications service companies provide several types of telecommunications circuits as part of their telecommunications service. These types of circuits fall into three primary categories, and are generally not part of plain old telephone service (POTS) or local telecommunications service. The three types of circuits include special service circuits (both access and private line), trunk circuits, and facility circuits. Special service circuits, include two separate types of circuits: telephone circuits and serial circuits. As the term itself denotes, special service circuits are used to provide telecommunications service to customers having certain specialized needs. Special service orders (SSO) are received and implemented by telecommunications companies for various situations such as, for example, political or industry conventions or state-wide lotteries. In these situations, upon receiving an SSO, a telecommunications service provider designs and implements special telephone or serial circuits at the location and for the time period requested by the user. For example, if a political convention required 50 telephone lines and 20 serial lines from the arena or meeting facility hosting the convention for a period of two weeks, this service would be ordered as SSOs and designed and implemented by the telecommunications service provider.

Trunk circuits are the interface for transmission, supervision, and signaling between switching systems. Trunk circuit orders (TCO) are typically placed by telecommunications service providers who are in need of additional message circuits. A facility circuit order (FCO) involves many telecommunications circuits. As with TCOs, FCOs are typically placed by telecommunications service providers. For example, a facility planning group of a service provider responsible for monitoring user traffic will order additional facility circuits in those locations experiencing heavy user traffic.

Most telecommunications service providers use some type of facility or system for receiving and managing the various types of circuit orders discussed above. These circuit order management systems receive both "access" and "non-access" orders. Both types of orders are commonly referred to as access service requests. Access orders are those orders received from the various long distance carriers. Non-access orders are received from local operating companies and users other than long distance carriers. Typically, circuit order management systems are staffed with personnel whose function is to enter or monitor the circuit orders received from the access or non-access users. These personnel are sometimes referred to in the industry as Interexchange Customer Service Centers (ICSC). Obviously, the objective for a telecommunications company providing this type of service is to receive information sufficient to design and implement circuit orders. The design of a circuit order is embodied in what is known in the industry as a circuit layout record (CLR). A CLR contains the design parameters of circuit orders and is used by field offices to physically implement circuit orders.

There are various types of legacy systems used in the telecommunications industry for receiving and implementing circuit orders. These systems include as one component an Access Request Management System (ARMS) which receives access and non-access circuit orders as described above and inputs the orders into an intelligible format for design and implementation by other system components or personnel. Essentially, the ARMS is an order entry system. Another component is an order tracking system which is used to track important information relating to the circuit orders such as order dates, due dates, milestone dates, service dates, etc. Certain legacy systems also include a provisioning component which is a partially mechanized system that assists in the creation of CLRs. If no provisioning component is available, the CLRs are manually created by an engineer.

A significant disadvantage of the above-described systems is that circuit orders must be manually entered into each component of the system. In other words, the same circuit order must be manually entered up to three times; once each into the ARMS, the order tracking system and the provisioning component if available. As the volume of circuit orders received by these systems increases, it is evident that a significant amount of time and resources are consumed by this procedure. Also, the legacy systems have no means for automatically communicating confirmation messages to the ARMS regarding the status of circuit orders. At best, the ARMS will receive a telephone call informing ARMS whether orders were accepted or rejected. A further disadvantage of these systems is that a design layout record (DLR) must be manually entered into the ARMS. A DLR contains information similar to that contained in the CLR, i.e., design parameters of the circuit order. DLRs are communicated by ARMS back to the interexchange carrier (IC) placing the order to inform the IC of the circuit design parameters. This provides the IC the ability to interface the circuit design with their own telecommunications system.

Another known telecommunications circuit order management and provisioning system is the TIRES (Trunks Integrated Record Keeping System) developed by Bellcore. TIRKS is a computer-based system which provides circuit order control, circuit design support, inventory record maintenance, selection and assignment of components from inventory, and preparation and distribution of circuit work orders. TIRES runs on a mainframe computer system. Generally, TIRKS receives circuit orders in an order control module which controls message/trunk, special service, and carrier system orders by tracking critical dates as the order is processed through completion. The order control module communicates with a circuit provisioning system which operates in conjunction with other TIRKS components to assign facility and equipment information for circuit orders and design circuits. Under certain conditions, TIRKS provides automated design criteria for particular circuit orders. The circuit design generated by TIRKS is communicated to a plant or field for implementation, and the plant also informs the order control module of the circuit implementation for tracking purposes.

Although TIRKS is a significant development in telecommunications circuit provisioning systems, TIRKS experiences certain important limitations common to other provisioning systems known in the art. Significantly, TIRKS and other provisioning systems operate entirely on mainframe computer systems. Such computer systems are considerably more expensive than mid-range distributed computer systems. Moreover, mainframe computer systems do not possess a high degree of flexibility in relation to modifications and upgrades as computer technology advances.

SUMMARY OF THE INVENTION

In view of the foregoing, it is a general aim of the present invention to provide a telecommunications circuit provisioning and administration system which efficiently receives, processes, and designs telecommunications circuit orders.

In accomplishing that aim, it is a primary object of the present invention to provide a telecommunications circuit provisioning and administration system that communicates detailed status information to an order entry system relating to the status of circuit orders.

It is a further object of the present invention to provide a telecommunications circuit provisioning and administration system that utilizes a distributed mid-range computer system capable of efficiently and cost-effectively communicating with mainframe computer systems.

It is another object of the present invention to provide a telecommunications circuit provisioning and administration system that is capable of producing automated circuit layout design records for a substantial quantity of circuit orders received.

It is yet another object of the present invention to provide a telecommunications circuit provisioning and administration system that automatically produces design layout records and communicates the design layout records to the order entry system.

These and other objectives are accomplished by the telecommunications circuit provisioning and administration system according to the present invention. The system of the present invention includes an access request management component which receives access service requests for a plurality of different types of telecommunications circuits, processes the access service requests, and produces provisioning data packets containing information relating to the requested telecommunications circuits. Each provisioning data packet includes at least one order relating to a telecommunications circuit. An interface is connected to the access request management component for transmitting information to and from the access request management component. The interface is capable of providing communication between mainframe computer systems and mid-range distributed systems. The system of the present invention also includes a circuit administration component connected to the interface which receives the provisioning data packets from the access request management component. A processor in the circuit administration component processes the information contained in the provisioning data packets and generates order confirmation messages containing information relating to the status of the requested telecommunications service orders. These confirmation messages are communicated to the access request management component through the interface. The circuit administration component is also capable of producing automated circuit layout records for the telecommunications circuit orders contained in the provisioning data packets.

DETAILED DESCRIPTION OF THE PREFERRED EMBODIMENT

While the invention will be described in connection with a preferred embodiment, there is no intent to limit the invention to this embodiment. On the contrary, the intent is to cover all alternatives, modifications, and equivalents included within the spirit and scope of the invention as defined in the appended claims.

Figure 1:
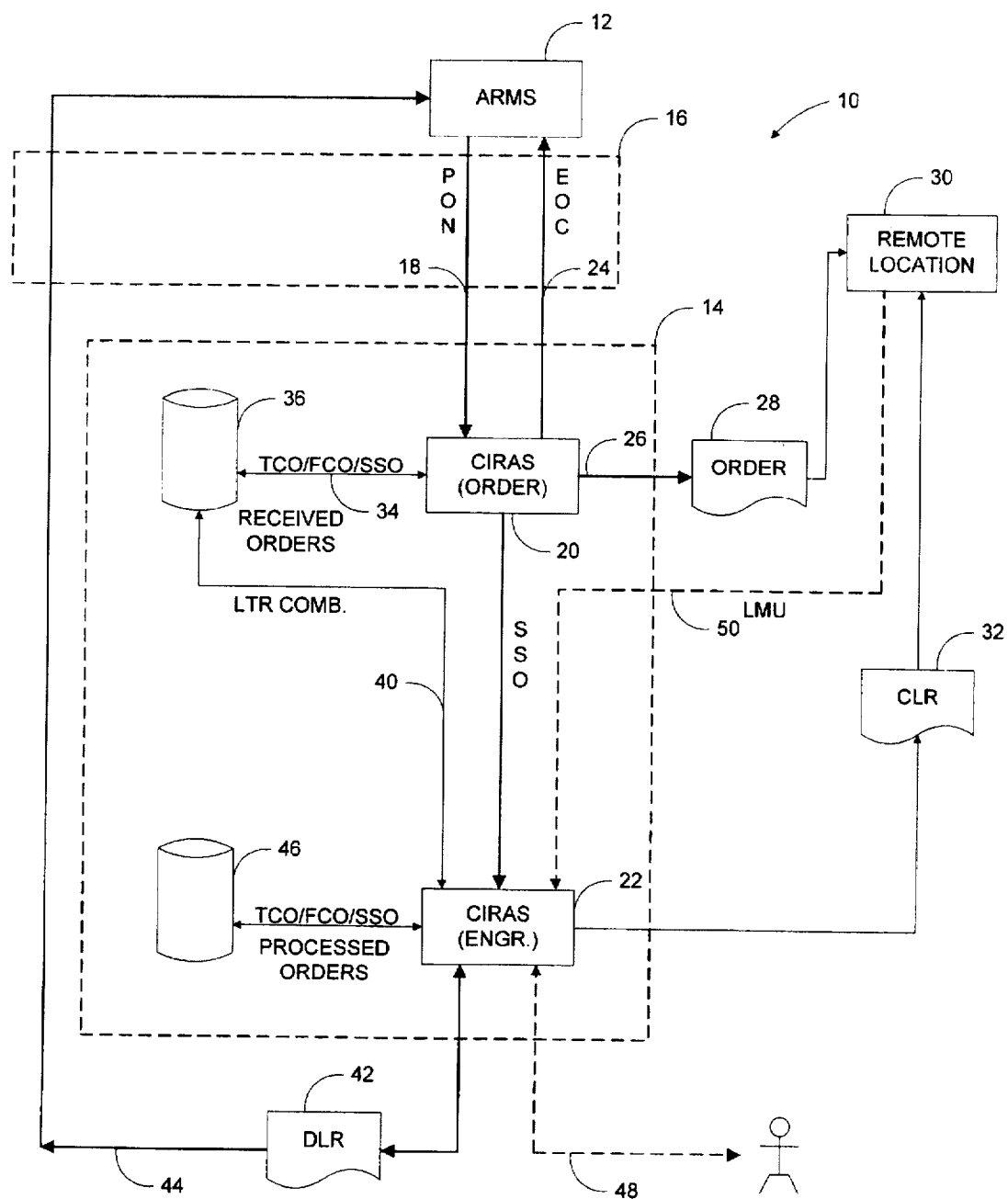
FIG. 1 is a block diagram generally illustrating the telecommunications circuit provisioning and administration system of the present invention.

Turning now to the drawings, FIG. 1 is a block diagram of a telecommunications circuit provisioning and administration system 10 according to the present invention. In the preferred embodiment, the telecommunications circuit provisioning and administration system 10 provides telecommunications service for trunk circuits, facility circuits, and special service circuits which include both telephone circuits and serial circuits. According to the invention, system 10 includes as one component an access request management system (ARMS) denoted as block 12. The ARMS 12 receives telecommunications circuit orders (i.e., access service requests) from both access and non-access telecommunications users. The access service requests contain both provisioning data and billing information. ARMS 12 transmits the provisioning data to another component of system 10 referred to as a circuit administration system (CIRAS) 14. In accordance with the present invention, CIRAS 14 processes the provisioning data received from ARMS 12 and generates circuit order design information which is ultimately transmitted to a remote location for implementation of the circuit orders.

Referring in more detail to ARMS 12 as shown in FIG. 1, ARMS 12 operates on an IBM 3090 computer system utilizing the MVS operating system in the CICS region. As noted above, ARMS 12 receives access service requests for a plurality of different types of telecommunications circuits (TCOs, FCOs, and SSOs). ARMS 12 then processes the access service requests and generates several items of information required for implementation of the circuit orders. For example, ARMS 12 generates provisioning data packets which contain information relating to the telecommunications circuits ordered in the access service requests. These provisioning data packets are identified with a purchase order number (PON), and can include either a single record transmission relating to a single telecommunications circuit order, or a series of records relating to multiple circuit orders. As discussed in further detail below, each provisioning data packet consists of at least one header record, one data record, and one trailer record. All data transmissions are formatted in character format. Each record in a provisioning data packet contains a standard control data area (STD-CTL), a standard key (STD-KEY), and a general data area. The standard control data (STD-CTL) area is reserved for system data provided for audit and debugging purposes. The format of the standard control (STD-CTL) data area is shown in the following table:

TABLE 1

| FIELD# | NAME | LTH | FIELD DESCRIPTION |
|---|---|---|---|
| 1 | TO-SYSID | 8 | Send-to system id |
| 2 | FROM-SYSID | 8 | From system id |
| 3 | FROM-TERMID | 8 | From terminal id |
|   | SENT-DATE-TIME |   | Sent date/time/sequence |

TABLE 1-continued

| FIELD# | NAME | LTH | FIELD DESCRIPTION |
|---|---|---|---|
| 4 | SENT-DATE | | Sent date |
| | SENT-CC2 | | Sent century |
| | SENT-YY2 | | Sent year |
| | SENT-MM2 | | Sent month |
| | SENT-DD2 | | Sent day |
| 5 | SENT-TIME | | Sent time |
| | SENT-HH2 | | Sent hour (military) |
| | SENT-MM2 | | Sent minute |
| | SENT-SS2 | | Sent second |
| | SENT-HS2 | | Sent 100th second |
| 6 | SENT-SEQUENCE | 3 | Sent DATE/TIME sequence |
| 7 | RELEASE-NO | 3 | Software release number |
| 8 | filler | 25 | future use |

The standard key (STD-KEY) data is reserved for fields which uniquely identify the provisioning data packets as data for a particular purchase order. The format of the standard key (STD-KEY) data is as follows:

TABLE 2

| FIELD# | NAME | LTH | FIELD DESCRIPTION |
|---|---|---|---|
| 1 | TO-OTC-ID | 4 | Intended OTC (ICSC codes: FLO3, OHO3, EGO5, MGO4, UTO2, UMO1, NCO1 |
| 2 | CCNA r/d ORIGIN | 4 | Cust Name Abbreviation |
| 3 | PON r/d PO | 16 | Purchase Order Number |
| 4 | filler | 25 | Future use |

The general data area of each record is reserved for data which changes with each interface process. The first character of the data area is always the record type. There are several different record types, including provisioning header, provisioning administrative, provisioning milestone, provisioning circuit, etc. The record type uniquely identifies the type of data to be provided with the record, as set forth in Table 3 below:

TABLE 3

| RECORD | LAYOUT NAME | REC-TYPE |
|---|---|---|
| Provisioning Header | AMCAHDRB | "H" |
| Provisioning Administrative | AMCAADMB | "A" |
| Provisioning Milestone | AMCAMILB | "M" |
| Provisioning Circuit | AMCACIRB | "C" |
| Provisioning Trailer | AMCATRLB | "T" |
| Milestone "Standalone" | AMCAMILB | "J" |
| Acceptance (Jeopardy/Date Change) | AMCAACMB | "B" |
| Engr. Order Confirmation | AMCAAFCB | "F" |
| DLR Upload | WAMDDUTB | "U" |
| DLR Upload Response | WAMDRSPB | "S" |

Thus, as shown in FIG. 1, provisioning data packets are transmitted to CIRAS 14 via an interface 16; specifically line 18 of interface 16. In a specific implementation of the preferred embodiment, interface 16 comprises a CICS application programming interface (API) utilized in conjunction with a TCP/IP network. Importantly, the interface of the present invention provides the capability of transmitting data in real-time between a mainframe computer system and a mid-range computer system.

In that connection, an important aspect of the present invention is that CIRAS 14 runs on a mid-range RISC 6000 computer operating on the AIX operating system. In the preferred embodiment, CIRAS 14 utilizes the Oracle software language. Oracle is a relational database management language and is advantageous for several reasons. For example, Oracle allows CIRAS 14 to run on over 80 different computer hardware platforms. In keeping with the present invention, by running in the distributed environment of the IBM RISC 6000, CIRAS 14 allows applications servers to be placed in the user areas and database operations support to reside in the data area. The distributed environment of CIRAS 14 provides additional advantages over mainframe systems. For example, mainframe systems are considerably more costly than distributed systems, both in hardware components and CPU processing time. Additionally, distributed systems provide significantly greater flexibility in system modifications and upgrades over mainframe systems as technology advances. CIRAS 14 uses Bellcore common language code sets, including Common Language Location Identifier (CLLI), Common Language Equipment Identifier (CLEI), Common Language Facility Identifier (CLFI), and Common Language Circuit Identifier (CLCI).

As shown in FIG. 1, CIRAS 14 includes two system components: CIRAS order functions denoted at block 20 and CIRAS engineering functions denoted at block 22. The order function component 20 of CIRAS 14 receives provisioning data packets via interface 16 and processes the information contained in the provisioning data packets. In general, this processing determines whether an order relating to a telecommunications circuit requests an entirely new circuit, a change to an existing circuit, or cancellation of an existing circuit. Additionally, in accordance with the present invention, CIRAS order component 20 produces engineering order confirmation (EOC) messages which are transmitted back to the ARMS 12. These EOC messages contain detailed information relating to the status of telecommunications service ordered in access service requests. For example, EOC messages indicate whether telecommunications circuit orders contained in provisioning data packets have been accepted, or whether errors are present in the provisioning data packets resulting in rejection of the circuit orders. EOC messages also provide specifics relating to the nature of errors. Further details of the EOC messages are provided below. As can be seen, EOC messages are transmitted from CIRAS 14 via line 24 of interface 16.

In keeping with the present invention, CIRAS 14 provides two options for designing and implementing the circuit orders received from ARMS 12. One option is to transmit the orders directly to a remote location for design and implementation, at which point a field engineer or other personnel will use the order information to manually design the circuit based on the requirements specified in the circuit orders. This option is designated in FIG. 1 at line 26 wherein the various types of circuit orders 28 are transmitted to a remote location 30 for manual design and implementation. These circuit orders 28 are communicated to the remote location 30 following the transmission of the EOC messages to the ARMS 12.

In accordance with a significant aspect of the present invention, the other option for implementing circuit orders is performed by the engineering function component 22 of CIRAS 14. Under this aspect of the invention, circuit order information from provisioning data packets is communicated to CIRAS engineering function component 22 which processes the information and generates automated circuit layout records 32 utilizing a software-assisted engineering process explained in detail below. The automated circuit layout record 32 is a computer-generated engineering design record which contains design parameters for a telecommunications circuit order. A significant advantage of the automated circuit layout records 32 is that CIRAS engineering function component 22 automatically performs a substantial part of the circuit engineering design and thus reduces or eliminates the manual intervention required in the manual design option explained above. Thus, the telecommunications circuit provisioning and administration system 10 of the present invention provides the capability of receiving access service requests, processing those requests to produce provisioning data packets, transmitting provisioning data packets over an interface capable of providing information exchange between mainframe and distributed computer systems, automatically generating engineering order confirmation messages relating to the status of the circuit orders, and generating automated circuit layout records containing design parameters of the circuit orders which can then be communicated to a remote location for implementation.

As can be seen in FIG. 1, SSOs, TCOs, and FCOs are transmitted from CIRAS component 20 via line 34 to a CIRAS received order files component 36. Also, SSOs are transmitted directly to CIRAS engineering component 22 via line 38 since EOC messages relating to SSOs are automatically generated without manual validation as is the case with FCOs and TCOs. Further details on this point are provided below in connection with FIG. 3. From component 36, local transport (LTR) combinations comprising SSO and FCO combinations, and TCO and FCO combinations are transmitted to CIRAS engineering component 22 via line 40.

In addition to circuit layout records 32, CIRAS 14 also generates automated design layout records 42 which contain design parameters for circuit orders similar to the parameters generated in the circuit layout records. The automated design layout records are transmitted back to ARMS 12 via line 44, which is also a part of interface 16. Importantly, the design layout records allow ARMS 12 to provide circuit design information to telecommunications customers (ICs) so that customers can interface circuit designs with their own telecommunications systems if necessary, and obtain details relating to equipment used for circuits that are not part of their own systems.

CIRAS 14 also includes a processed order files component 46 which stores processed orders relating to SSOs, TCOs, and FCOs. In addition, CIRAS 14 includes a design information input line 48 which allows a remote location to manually intervene in the design of the circuit layout records 32 if required. Also shown in FIG. 1 is a loop makeup (LMU) line 50 interconnecting the remote location 30 and the CIRAS engineering component 22 so that the remote location can provide loop makeup parameters to CIRAS engineering component 22.

Figure 2:
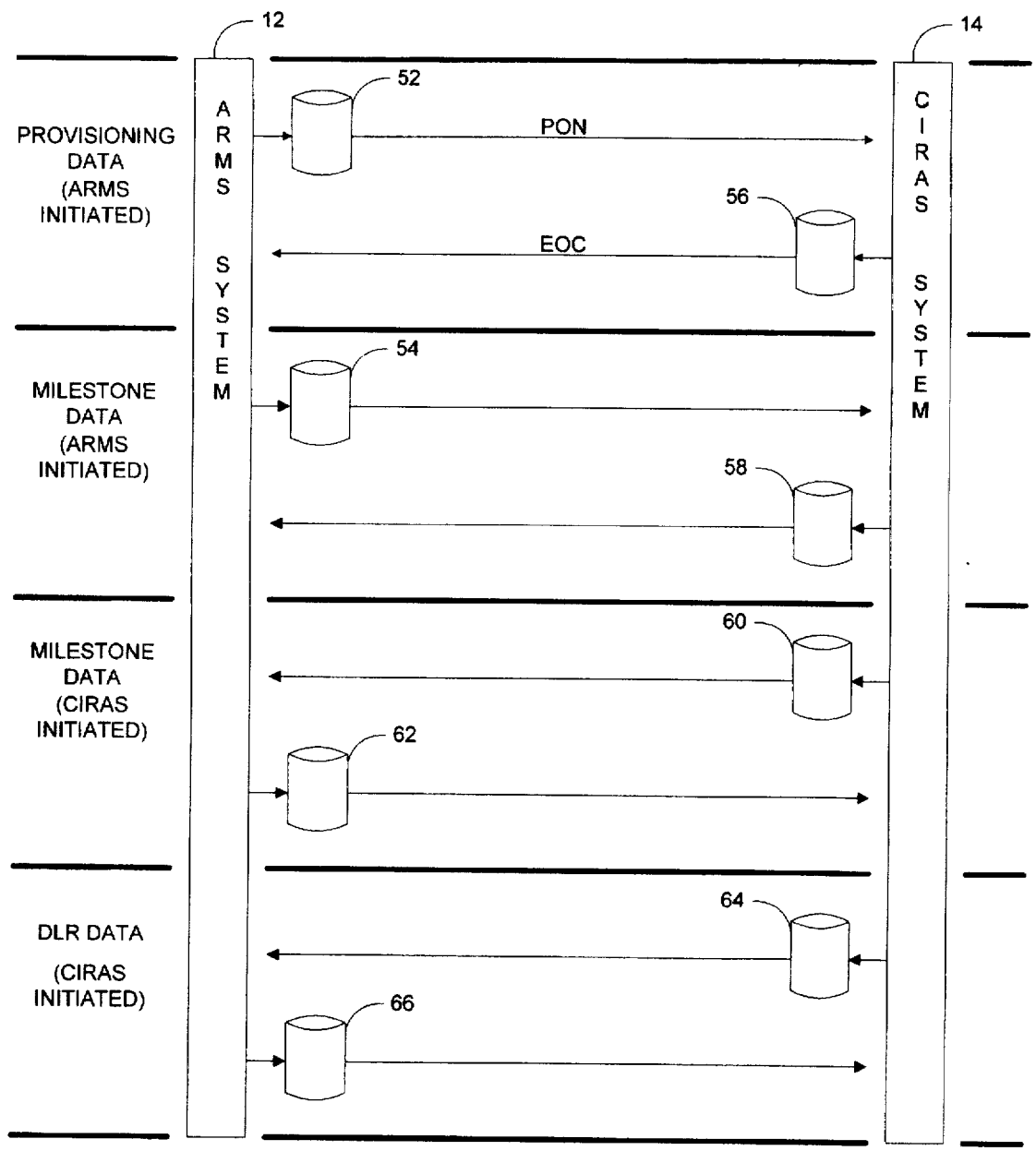
FIG. 2 is a block diagram illustrating the order processing interface record flow for the system shown in FIG. 1.

FIG. 2 is a block diagram illustrating the order processing interface record flow between CIRAS 14 and ARMS 12 of the telecommunications circuit provisioning and administration system 10 shown in FIG. 1. This figure illustrates the different types of information which are transmitted between ARMS 12 and CIRAS 14. As explained above, the transmission processing is designed so that ARMS 12 initiates the introduction of a circuit order into the interface process. CIRAS 14 responds to that order information. When corrections relating to circuit order information are required, CIRAS 14 sends correction information in the form of EOC messages as a response to circuit orders. When this occurs, ARMS 12 processes the correcting data and, rather than responding to the correction itself, initiates a new cycle of provisioning data transmissions. The ARMS-initiated transactions include the provisioning data packets, milestone transactions consisting of single-record transactions containing jeopardy and/or date-change information, acceptance transactions consisting of single-record responses to CIRAS-initiated milestone transactions, and design layout record upload response transactions. Milestone transactions and acceptance transactions for a specific request can only occur after the provisioning data packet for that request is initially sent from ARMS.

The provisioning data packets, denoted at block 52 in FIG. 2, contain three types of records: a header record, application records, and a trailer record. The header record identifies the user/customer which ordered the service, the purchase order number (PON) associated with the service, a record type (REC-TYPE) and a request mode. The header record also records the total number of records in the provisioning data packet and the total number of circuit records included in the packet. One and only one header record is allowed per packet and must precede the application records. The header record has a REC-TYPE of "H".

The application records contain the provisioning data needed by CIRAS for a single access service request or Intra-LATA order. There are three types of application records: administrative records, milestone records, and circuit records. Administrative records have a REC-TYPE of "A." One and only one administrative record is sent in a provisioning data packet. The administrative record is the first application record in a packet and follows the header record. Milestone records have a REC-TYPE of "M". One and only one milestone record is sent in a provisioning data packet. The milestone record is the second application record in a packet and follows the administrative record. The circuit record has a REC-TYPE of "C". There may be one or a plurality of circuit records in a provisioning packet. Finally, the trailer record is used to indicate that the provisioning data packet is complete. One and only one trailer record is allowed per packet, and must follow the last circuit record in the packet. The trailer record has a REC-TYPE of "T".

As mentioned above, several different types of transactions are possible when a circuit order is placed by a customer. In the event that the circuit order contains a request mode (REQ-MODE) for a new circuit, this is designated as an initial transaction and identified with an "I" in the REQ-MODE field of the header record. The "I" identifies the transaction as the first time the purchase order number (PON) associated with a circuit order has been sent to CIRAS 14. In certain instances, existing circuits require correction. When a correction to a provisioning data packet is necessary, the entire packet is sent with a "C" in the REQ-MODE field of the header record. Some corrections result in changes impacting the circuit design, while others are informational only. In accordance with the present invention, CIRAS 14 is capable of processing the correction transactions to determine which corrections are informational only and which have an impact on the circuit design.

If a customer requests the cancellation of an existing circuit, a cancel transaction is necessary, wherein the provisioning data packet is sent with a "K" in the REQ-MODE field of the header record. A cancel transaction will be sent to CIRAS 14 when a cancel order is received in ARMS 12 from a customer. The cancel transaction packet contains only a header record, the administrative record, and the trailer record, in that sequence. In this circumstance, the cancel transaction is sent to cancel all circuits associated with the PON identified in the header record.

Another type of transaction is a resend transaction which indicates that certain circuit order information was previously sent to CIRAS 14 and should exist in the CIRAS database, but either ICSC or field engineers requested that the information be resent. When a resend transaction is necessary, the entire provisioning data packet is sent with an "R" in the REQ-MODE field of the header record. If the PON in the transaction packet does not exist on the CIRAS database, it will be added. If the PON does exist on the CIRAS database, no action will be taken in CIRAS.

The provisioning header record in the provisioning data packets includes such information as the transaction type of circuit order (initial send, cancel, correction, resend), the total number of records being sent in a particular packet, the number of circuits to be sent in a particular packet, and date and time information relating to the order. Table 4 below sets forth the types of data and a description of the fields contained in the provisioning header record:

TABLE 4

| FIELD# | NAME | LTH | FIELD DESCRIPTION |
|---|---|---|---|
|  | H-STD-CTL | 71 | Standard Control Data |
|  | H-STD-KEY | 49 | Standard Key |
| 1 | H-REC-TYPE2 |  | Must be "H." Identifies the record as being a Provisioning Header record. |
| 2 | H-REQ-MODE1 |  | Request Mode identifies the packet as being one of the following: I = Initial send K = Kill (Cancel) R = Resend C = Correction |
| 3 | H-NBR-RECS3 |  | This field contains the total number of records being sent in the packet, counting from Header to Trailer, every record type. |
| 4 | H-NBR-CIRCUITS | 3 | Three character number identifying the number of circuits to be sent in this packet, i.e., the number of record type "C" records to be included in this packet. |
| 5 | H-ORIG-SENT-DATE-TIME |  | If Header is for a ARMS to CIRAS Provisioning Data Packet, then this date is blank. If Header is for a CIRAS to ARMS Engr. Order Confirmation Packet, then this date will contain the date and time the original Provisioning Data Packet was sent to CIRAS. |
|  | G-SENT-DATE |  | Original sent date |
|  | H-ORIG-SENT-CC | 2 | Original sent century |
|  | H-ORIG-SENT-YY | 2 | Original sent year |
|  | H-ORIG-SENT-MM | 2 | Original sent month |
|  | H-ORIG-SENT-DD | 2 | Original sent day |
|  | H-ORIG-SENT-TIME |  | Original sent time |
|  | H-ORIG-SENT-HH | 2 | Original sent hour (military) |
|  | H-ORIG-SENT-MM | 2 | Original sent minute |
|  | H-ORIG-SENT-SS | 2 | Original sent second |
|  | H-ORIG-SENT-HS | 2 | Original sent 100th second |
| 6 | filler | 25 | Future use |

The provisioning administrative record includes significantly more information than the header record, such as whether the order is an access order or a non-access order, the ARMS activity code, specifics relating to the location of the circuit order, etc. Table 5 below provides a detailed listing of the types and number of fields contained in the administrative record:

TABLE 5

| FIELD# | NAME | LTH | FIELD DESCRIPTION |
|---|---|---|---|
|  | A-STD-CTL | 71 | Standard Control Data |
|  | A-STD-KEY | 49 | Standard Key |
| 1 | A-REC-TYPE | 2 | Must be "A." Identifies the record as being a Provisioning Administrative record. |
| 2 | A-ASR-NO | 18 | ASR Number |
| 3 | A-ACCESS-FLAG | 1 | A = Access order, N = Non-access |
| 4 | A-ACTIVITY-CD | 1 | ARMS Activity code as follows: N = New request C = Change request D = Disconnect request M = Inside Move request T = Outside Move request R = Record request This will be populated in the CIRAS order STATUS field. |
| 5 | A-REP-NAME | 30 | ARMS Assigned User Id. |
| 6 | A-PROJECT-NBR | 16 | ARMS Administrative project number. This is not the same as the ICSC project number maintained in CIRAS. |
| 7 | A-RPON-CCVN | 8 | Related PON CCVN |
| 8 | A-RPON | 16 | Related Purchase Order Number. |
| 9 | A-EXCHANGE-ORD# | 13 | Exchange Order Number (Intralata Only) |
| 10 | A-REQTYPE | 2 | ARMS Requisition Type. This will be populated in the Serv Class field in CIRAS. Valid values from ARMS are as follows: W = Wats S = Special E = End User Special M = Switched L = CCS Links A = FG-A PS = Private Line Special PW = Private Line Wats PL = Private Line Local Loop FX = FX orders DD = DID |
| 11 | A-SUPP | 1 | Supplement type as follows: 1 = Cancel 2 = Change to DDD after EOC 3 = Change after EOC 4 = Change before EOC Note: 2 and 3 require a new EOC. |
| 12 | A-TSP | 12 | Telecommunications Service Priority. |
| 13 | A-PIU | 3 | Percentage of Interstate Usage. Values from ARMS will include the following: 000–100 = percentage LOF = letter on file. |
| 14 | A-NBR-OF-LEGS | 2 | Number of circuit legs. |

TABLE 5-continued

| FIELD# | NAME | LTH | FIELD DESCRIPTION |
|---|---|---|---|
| 15 | A-INIT | 15 | Initiator Id |
| 16 | A-INIT-TELNO | 14 | Initiator Telephone Number |
|  | A-DESIGN_CONTACT_INFO |  |  |
| 17 | A-DESIGN-CONTACT | 15 | Eng. design contact |
| 18 | A-DSGN-TELNO | 14 | Eng. design contact telephone number |
| 19 | A-DSGN-ADDR | 30 | Miscellaneous address info |
| 20 | A-DSGN-HOUSE-NBR | 6 | House Number not in ARMS |
| 21 | A-DSGN-FRACTION | 3 | Fraction not in ARMS |
| 22 | A-DSGN-DIRECTIONAL | 3 | Directional not in ARMS |
| 23 | A-DSGN-STREET | 25 | Street name not in ARMS |
| 24 | A-DSGN-STREET-TYPE | 6 | Street type not in ARMS |
| 25 | A-DSGN-SUFFIX | 3 | Address suffix not in ARMS |
| 26 | A-DSGN-BUILDING | 15 | Building name |
| 27 | A-DSGN-FLOOR | 9 | Building floor |
| 28 | A-DSGN-ROOM | 9 | Room information |
| 29 | A-DSGN-UNIT | 5 | Unit |
| 30 | A-DSGN-UNIT-TYPE | 5 | Unit Type |
| 31 | A-DSGN-BOX-IND | 1 | Box indicator |
| 32 | A-DSGN-CITY | 25 | City |
| 33 | A-DSGN-STATE-CD | 2 | State code |
| 34 | A-DSGN-ZIP-CD | 10 | Zip code |
| 35 | A-MTCECON | 11 | Eng. design contact (Maint) |
| 36 | A-MTCE-TELNO | 10 | Eng. design contact (Maint) |
| 37 | A-IMPCON | 15 | Eng. design contact (Implementation) |
| 38 | A-IMPCON-TELNO | 14 | Eng. design contact (Implementation) |
| 39 | A-ACTL | 11 | Access Customer Terminal Location |
| 40 | A-APOT | 11 | Additional Point of Termination |
| 41 | A-CIRCUIT-QTY1 | 7 | Number of circuits, BHMS, or percent market share |
| 42 | A-UNIT | 1 | C = number of lines/trunks<br>B = busy hour minutes (bhms)<br>P = percent of market share |
| 43 | A-NSL | 2 | Number of Secondary Locations |
| 44 | A-EML | 12 | Expected Measured Loss |
| 45 | A-SR | 2 | Special routing code |
| 46 | A-CHANNEL | 2 | Channel |
| 47 | A-ARMS-ORDER-VERSION | 3 | ARMS order version |
| 48 | A-CARRIER-VERSION | 2 | Carrier order version |
| 49 | A-DCDLRD-FLAG | 2 | DLR Required Flag |
| 50 | A-ASC-EC4 |  | Access Service Coordination Exchange Company (N/A for TCO Orders) |
|  | A-PRILOC-INFO |  |  |
| 51 | A-PRILOC | 25 | Primary Location |
| 52 | A-PRILOC-NAME | 30 | Name |
| 53 | A-PRILOC-ADDR | 30 | Miscellaneous address info |
| 54 | A-PRILOC-HOUSE-NBR | 6 | House Number not in ARMS |
| 55 | A-PRILOC-FRACTION | 3 | Fraction not in ARMS |
| 56 | A-PRILOC-DIRECTIONAL | 3 | Directional not in ARMS |
| 57 | A-PRILOC-STREET | 25 | Street name not in ARMS |
| 58 | A-PRILOC-STREET-TYPE | 6 | Street type not in ARMS |
| 59 | A-PRILOC-SUFFIX | 3 | Address suffix not in ARMS |
| 60 | A-PRILOC-BUILDING | 15 | Building name |
| 61 | A-PRILOC-FLOOR | 9 | Building floor |
| 62 | A-PRILOC-ROOM | 9 | Room Info |
| 63 | A-PRILOC-UNIT | 5 | Unit |
| 64 | A-PRILOC-UNIT-TYPE | 5 | Unit Type |
| 65 | A-PRILOC-BOX-IND | 1 | Box indicator |
| 66 | A-PRILOC-CITY | 25 | City |
| 67 | A-PRILOC-STATE-CD | 2 | State code |
| 68 | A-PRILOC-ZIP-CD | 10 | Zip code |
| 69 | A-PRILOC-JKCODE | 5 | Jack Code |
| 70 | A-PRILOC-JKNUM | 2 | Jack Number |
| 71 | A-PRILOC-JKPOS | 2 | Jack Position |
| 72 | A-PRILOC-JS | 1 | Jack Status |
| 73 | A-PRILOC-CONTACT | 25 | Contact |
| 74 | A-PRILOC-TELNO | 14 | Contact telephone number |
| 75 | A-PRILOC-SPOT | 11 | Secondary Location Point of Termination (Primary Location) |
| 76 | A-ADMIN-RMKS | 186 | ARMS Administrative Remarks. These will be populated in CIRAS ICSC Remarks. |
| 77 | A-GEN-RMKS | 700 | ARMS General Remarks. These will be populated in CIRAS ICSC Remarks. |
|  | A-WATS-ONLY |  |  |
| 78 | A-BAND | 1 | Band Identification |
| 79 | A-DTO | 7 | Dial Tone Office |
|  | A-FG-B-C-D-ONLY |  |  |
| 80 | A-CIRCUIT-QTY 2 | 7 | Number of circuits, BHMS, or percent market share when second TRFTYP is required. |
| 81 | A-ALTACTL | 11 | Alternate Access-Customer Terminal Location |
| 82 | A-ALTRO | 17 | Alternate Order Number |
| 83 | A-ANI | 1 | Alternate Number Id |
| 84 | A-CGAP | 3 | Channel Gapping interval |
| 85 | A-CHOK | 3 | Choke network |
| 86 | A-CIC | 5 | Carrier Id Code |
| 87 | A-CSPC | 9 | Customer Signalling Point Code |
| 88 | A-RECCKT1 | 53 | Related Exchange Company Id1 |
| 89 | A-RECCKT2 | 53 | Related Exchange Company Id2 |
| 90 | A-SCRT | 53 | Service Class Routing |
| 91 | A-TCIC | 10 | Trunk Circuit Identification Code |
| 92 | A-TSC | 8 | Two Six Code |
| 93 | A-LT | 1 | Link Type |
| 94 | A-SLC | 2 | Signaling Link Code |
| 95 | A-TRFTYP | 5 | Traffic Type |
| 96 | A-MULTI-POINT-IND | 1 | Y/N Multi Point Indicator |
| 97 | filler | 100 | Future use |

The provisioning milestone record contains information relating to target dates for completing certain aspects of the circuit order. For example, the provisioning milestone record contains information relating to the service order issue date, the plant test target date, and the due date target. Table 6 below provides details relating to the types and number of fields contained in the provisioning milestone record:

TABLE 6

| FIELD# | NAME | LTH | FIELD DESCRIPTION |
|---|---|---|---|
|   | M-STD-CTL | 71 | Standard Control Data |
|   | M-STD-KEY | 49 | Standard Key |
| 1 | M-REC-TYPE | 2 | Must be "M." Identifies the record as being a Provisioning Milestone record. |
| 2 | M-ASR-NO | 18 | ASR Number or SYSNO |
| 3 | M-ACCESS-FLAG | 1 | A = Access, N = Non-access |
| 4 | M-APP-DATE |   | Application date. ARMS will populate, CIRAS will not. |
|   | M-APP-MM | 2 | APP month |
|   | M-APP-DD | 2 | APP day |
|   | M-APP-YY | 2 | APP year |
| 5 | M-SID-TARGET-DATE |   | Service Order Issue Date |
|   | M-SID-MM | 2 | SID month |
|   | M-SID-DD | 2 | SID day |
|   | M-SID-YY | 2 | SID year |
| 6 | M-SID-CHG-RSN-CD2 |   | Service order Issue Date change reason code |
| 7 | M-SID-JPY-RSN-CD2 |   | Service Order Issue Date jeopardy reason code |
| 8 | M-SID-ACTUAL-DATE |   | Service order Issue Date actual. ARMS will populate, CIRAS will not. |
|   | M-ASID-MM | 2 | ASID month |
|   | M-ASID-DD | 2 | ASID day |
|   | M-ASID-YY | 2 | ASID year |
| 9 | M-EOC-TARGET-DATE |   | Engr. Order Confirmation. ARMS will populate, CIRAS will not. |
|   | M-EOC-MM | 2 | EOC month |
|   | M-EOC-DD | 2 | EOC day |
|   | M-EOC-YY | 2 | EOC year |
| 10 | M-EOC-CHG-RSN-CD | 2 | Engr. Order Confirmation change reason code |
| 11 | M-EOC-JPY-RSN-CD | 2 | Engr. Order Confirmation jeopardy reason code |
| 12 | M-EOC-ACTUAL-DATE |   | Engr. Order Confirmation actual date. ARMS will populate, CIRAS will not. |
|   | M-AEOC-MM | 2 | AEOC month |
|   | M-AEOC-DD | 2 | AEOC day |
|   | M-AEOC-YY | 2 | AEOC year |
| 13 | M-DLR-TARGET-DATE |   | Design Layout Report target date. ARMS will populate, CIRAS will not. |
|   | M-DLR-MM | 2 | DLR month |
|   | M-DLR-DD | 2 | DLR day |
|   | M-DLR-YY | 2 | DLR year |
| 14 | M-DLR-CHG-RSN-CD | 2 | Design Layout Report change reason code |
| 15 | M-DLR-JPY-RSN-CD | 2 | Design Layout Report jeopardy reason code |
| 16 | M-DLR-ACTUAL-DATE |   | Design Layout Report actual date ARMS will populate, CIRAS will not. |
|   | M-ADLR-MM | 2 | ADLR month |
|   | M-ADLR-DD | 2 | ADLR day |
|   | M-ADLR-YY | 2 | ADLR year |
| 17 | M-PTD-TARGET-DATE |   | Plant Test Date target. ARMS will populate, CIRAS will not. |
|   | M-PTD-MM | 2 | PTD month |
|   | M-PTD-DD | 2 | PTD day |
|   | M-PTD-YY | 2 | PTD year |
| 18 | M-PTD-CHG-RSN-CD2 |   | Plant Test Date change reason code |
| 19 | M-PTD-JPY-RSN-CD2 |   | Plant Test Date jeopardy reason code |
| 20 | M-PTD-ACTUAL-DATE |   | Plant Test Date actual date. CIRAS will populate, ARMS will not. |
|   | M-APTD-MM | 2 | APTD month |
|   | M-APTD-DD | 2 | APTD day |
|   | M-APTD-YY | 2 | APTD year |
| 21 | M-DD-TARGET-DATE |   | Due Date target. ARMS will populate, CIRAS will not. |
|   | M-DD-MM | 2 | DD month |
|   | M-DD-DD | 2 | DD day |
|   | M-DD-YY | 2 | DD year |
| 22 | M-DD-CHG-RSN-CD | 2 | Due Date — change reason code |
| 23 | M-DD-JPY-RSN-CD | 2 | Due Date — jeopardy reason code |
| 24 | M-DD-ACTUAL-DATE |   | Due Date — actual date. CIRAS will populate, ARMS will not. |
|   | M-ADD-MM | 2 | ADD month |
|   | M-ADD-DD | 2 | ADD day |
|   | M-ADD-YY | 2 | ADD year |
| 25 | filler | 50 | Future use |

The provisioning circuit record contains considerable information relating to the design criteria and specific location of a circuit requested in a particular order. Table 7 sets forth details relating to the information contained in the provisioning circuit record:

TABLE 7

| FIELD# | NAME | LTH | FIELD DESCRIPTION |
|---|---|---|---|
|   | C-STD-CTL | 71 | Standard Control Data |
|   | C-STD-KEY | 49 | Standard Key |
| 1 | C-REC-TYPE | 2 | Record Type (C). Must be "C." Identifies the record as being a Provisioning Circuit record. |
| 2 | C-ASR-NO | 18 | SASR Number or SYSNO |
| 3 | C-ACCESS-FLAG | 1 | A = Access, N = Non-access |
| 4 | C-REFNUM4 |   | Reference Number |
| 5 | C-CKT-TYPE | 1 | Circuit format type as follows: T = Telephone S = Serial M = Message F = Facility |
| 6 | C-CKT-ID5 | 3 | Circuit Id |
| 7 | C-NC-CODE | 4 | Network Channel code |
| 8 | C-NCI-CODE | 12 | Network Channel Interface code |
| 9 | C-CFA | 42 | Connecting Facility Assignment |
| 10 | C-TLV | 12 | Transmission Level |
| 11 | C-CKLT | 12 | Bridging Location |
| 12 | C-SECTLV | 12 | Secondary Transmission Level |
| 13 | C-HVP | 1 | High Voltage Protection |
| 14 | C-SVCCAT | 2 | Service Category |
| 15 | C-SVCTYP | 6 | Service Type |
| 16 | C-LSGS | 2 |   |
| 17 | C-CKR | 53 | IC Circuit Reference |
| 18 | C-MI | 2 | Machine Interface Code |
| 19 | C-ORD | 11 | Order Number. This is the EC Order Number which is assigned 1 per circuit for message circuits, or 1 per section or leg on special circuits. Either way, it will not be |

TABLE 7-continued

| FIELD# | NAME | LTH | FIELD DESCRIPTION |
|---|---|---|---|
| 20 | C-TECH-TYPE-RMKS | 124 | used as the CIRAS order number, but will be stored as data in CIRAS for reference and lookup. Tech type remarks. This will get populated in CIRAS Circuit or Facility remarks. |
|  | C-SECLOC-OR-EU-INFO |  |  |
| 21 | C-SECLOC | 25 | Secondary Location |
| 22 | C-SECLOC-NAME | 30 | End User Name |
| 23 | C-SECLOC-ADDR | 30 | Miscellaneous address info |
| 24 | C-SECLOC-HOUSE-NBR | 6 | House Number — not in ARMS |
| 25 | C-SECLOC-FRACTION | 3 | Fraction — not in ARMS |
| 26 | C-SECLOC-DIRECTIONAL | 3 | Directional — not in ARMS |
| 27 | C-SECLOC-STREET | 25 | Street name — not in ARMS |
| 28 | C-SECLOC-STREET-TYPE | 6 | Street type — not in ARMS |
| 29 | C-SECLOC-SUFFIX | 3 | Address suffix — not in ARMS |
| 30 | C-SECLOC-BUILDING | 15 | Building name |
| 31 | C-SECLOC-FLOOR | 9 | Building floor |
| 32 | C-SECLOC-ROOM | 9 | Room Info. |
| 33 | C-SECLOC-UNIT | 5 | Unit |
| 34 | C-SECLOC-UNIT-TYPE | 5 | Unit Type |
| 35 | C-SECLOC-BOX-IND | 1 | Box indicator |
| 36 | C-SECLOC-CITY | 25 | City |
| 37 | C-SECLOC-STATE-CD | 2 | State code |
| 38 | C-SECLOC-ZIP-CD | 10 | Zip code |
| 39 | C-SECLOC-JKCODE | 5 | Jack Code |
| 40 | C-SECLOC-JKNUM | 2 | Jack Number |
| 41 | C-SECLOC-JKPOS2 |  | Jack Position |
| 42 | C-SECLOC-JS | 1 | Jack Status |
| 43 | C-SECLOC-CONTCT | 25 | Contact |
| 44 | C-SECLOC-CONTCT-TELNO | 17 | Contact telephone number |
| 45 | C-SECLOC-SPOT | 11 | Secondary Point of Termination (CLLI) |
| 46 | C-SEG | 3 | Circuit Segment |
| 47 | C-LEGNUM | 6 | Circuit leg number |
| 48 | C-LEG-ACTIVITY-CD | 1 | Circuit leg activity code are: C = Change Leg D = Disconnect Leg K = Cancel Leg for this request M = Inside Move Leg N = New Connect R = Record (Admn. Changes) T = Outside Move NOTE: The 'T' will only be passed with additional Circuit Information (ACI) requests. |
| 49 | C-RORD | 17 | Related Order number |
| 50 | C-ACC | 45 | Access info for end user loc |
| 51 | C-ACTEL | 17 | Access telephone |
| 52 | C-ALOC | 106 | Additional Location details |
| 53 | C-LCON | 15 | Local contact |
| 54 | C-MUXLOC | 11 | Multiplexing Location |
| 55 | C-REN 4 |  | Ringer Equivalence Number |
| 56 | C-SECNCI | 12 | Secondary Network Channel Interface code |
| 57 | C-SCFA | 42 | Secondary Connecting Facility Assignment |
| 58 | filler | 100 | Future use |

Referring still to FIG. 2, in addition to the provisioning data packets 52, ARMS 12 also initiates milestone transactions denoted by block 54. These transactions are initiated to update milestone target dates associated with particular circuit orders. Milestone target dates may be updated in ARMS 12 to set jeopardies, to change any or all of the target dates, or to add actual dates. These updates can occur independently of other order activity and/or changes to the order. When such independent action occurs, the information is sent to CIRAS 14 from ARMS 12 in a stand-alone milestone transaction packet. In this situation, neither a header record nor a trailer record are required. In this transaction, a REQ-TYPE of "J" and the milestone record format is used.

As shown in FIG. 2, CIRAS 14 also initiates several transactions that are communicated to ARMS 12. One important transaction relative to the present invention is the engineering order confirmation (EOC) messages. In accordance with the invention, an EOC message is automatically generated by CIRAS 14 and contains detailed information relating to the status of the telecommunications service ordered by a particular customer. For example, EOC messages indicate whether the telecommunications circuit orders as transmitted in the provisioning data packets have been accepted by CIRAS, or whether errors are present in the provisioning data packets. The engineering order confirmation messages are denoted by block 56 in FIG. 2.

EOC messages are transmitted to ARMS 12 via a data transaction packet similar to the provisioning data packets transmitted from ARMS 12 to CIRAS 14. EOC transaction packets are used to communicate to ARMS 12 that a provisioning data packet was received and processed by CIRAS 14. CIRAS 14 sends a REC-TYPE "F" for every record received in the provisioning data packet except the trailer. The EOC header record data contains the initial date and time that the provisioning data packet was sent. The EOC records following the header record inform ARMS 12 if the circuit order was accepted as sent, or if the circuit identification was corrected. If the circuit identification was corrected, then the corrected circuit identification will be provided in the EOC record.

The EOC records contained in the EOC data transaction packet include a field titled F-STATUS-IND which indicates whether the provisioning data packet was accepted. An F-STATUS-IND field is included in the EOC transaction packet for each circuit order contained in a provisioning data packet sent from ARMS 12. If the first F-STATUS-IND is set to "NO" on the EOC record following the provisioning data header, this indicates that the entire provisioning data packet was rejected by CIRAS 14. Subsequent F-STATUS-IND fields may be checked, and may be found to contain "OK." This capability is provided to inform ARMS 12 of the particular records that are acceptable versus the records which failed. Only after all records in the provisioning data packet pass CIRAS validation, i.e., have a F-STATUS-IND of "OK," will the first F-STATUS-IND on the header be set to "OK."

Table 8 sets forth details relating to the information contained in the EOC transaction packets:

TABLE 8

| FIELD# | NAME | LTH | FIELD DESCRIPTION |
|---|---|---|---|
| | F-STD-CTL | 71 | Standard Control Data |
| | F-STD-KEY | 49 | Standard Key |
| 1 | F-REC-TYPE | 2 | Must be "F." Identifies the record as being an Acceptance Transaction of a Provisioning Data Packet record. |
| 2 | F-ASR-NO18 ASR Number or SYSNO | | |
| 3 | F-ACCESS-FLAG | 1 | A = Access, N = Non-access |
| 4 | F-RECORD-BEING-EOC | 2 | Record type being EOC'd H, A, M, C |
| 5 | F-STATUS-IND | 2 | Return status from CIRAS system as follows: OK = CIRAS accepted and processed this record. If this is the EOC record following the Provisioning Data Header record, it means all records in the EOC Data Packet were accepted and processed. NO = CIRAS rejected the Provisioning Data packet. Error numbers and error messages are provided in each EOC record and pertain to the Provisioning Data Record which preceded. |
| 6 | F-NBR-ERRORS | 3 | Indicates how many errors were detected by CIRAS in the preceding Provisioning Data record. |
| 7 | F-MSG-1-ID | 4 | Unique identifier for error. |
| 8 | F-MSG-1 | 60 | Error message text. |
| 9 | F-MSG-2-ID | 4 | Message 2 Id |
| 10 | F-MSG-2 | 60 | Message 2 Text |
| 11 | F-MSG-3-ID | 4 | Message 3 Id |
| 12 | F-MSG-3 | 60 | Message 3 Text |
| 13 | F-MSG-4-ID | 4 | Message 4 Id |
| 14 | F-MSG-4 | 60 | Message 4 Text |
| 15 | F-MSG-5-ID | 4 | Message 5 Id |
| 16 | F-MSG-5 | 60 | Message 5 Text |
| 17 | F-REFNUM | 4 | Refnum (always required when F-RECORD-BEING-EOC is "C") |
| 18 | F-OLD-CKT-TYPE | 1 | Old Circuit Type |
| 19 | F-OLD-CIRCUIT-ID | 53 | Old Circuit Id, before correction |
| 20 | F-COR-CKT-TYPE | 1 | Corrected Circuit Type |
| 21 | F-COR-CIRCUIT-ID | 53 | Corrected Circuit Id. |
| 22 | F-COR-TSC | 8 | Corrected 2/6 Code |
| 23 | F-ECSPC-13 | | Exchange Companies Signaling Point Code |
| 24 | F-ECSPC-23 | | Exchange Companies Signaling Point Code |
| 25 | F-ECSPC-33 | | Exchange Companies Signaling Point Code |
| 26 | filler | 25 | Future use |

In addition to the EOC transaction packets, CIRAS 14 initiates several other transactions. For example, as denoted at block 58 of FIG. 2, CIRAS 14 generates acceptance transaction messages in response to milestone transactions 54 initiated by ARMS 12. Acceptance transactions 58 include an acceptance transaction record for jeopardy/date changes used to communicate to ARMS 12 that a milestone transaction was received and processed by CIRAS 14. Block 60 of FIG. 2 denotes milestone transactions that are initiated by CIRAS 14 rather than ARMS 12. Milestone transactions 60 include a milestone transaction record for jeopardy/date changes and are used to communicate to ARMS 12 that milestone information requires updating. This record is used to set jeopardies, and to add actual dates. The milestone record layout is similar to the layout for provisioning milestone record transactions referred to in Table 6 above, except that the REC-TYPE is "J" instead of "M." In response to milestone transactions 60 initiated by CIRAS 14, ARMS 12 generates acceptance transactions denoted at block 62 to indicate that milestone transactions 60 were received and processed by ARMS 12.

As mentioned above in connection with FIG. 1, CIRAS 14 generates automated design layout records containing design parameters for the telecommunications circuit orders and communicates the design layout records to ARMS 12. In FIG. 2, block 64 denotes the automated design layout records that are initiated by CIRAS 14 and transmitted to ARMS 12. In the present invention, block 64 comprises a design layout record (DLR) upload transaction. Details relating to the various fields contained in the DLR upload transaction record layout are listed below in Table 9:

TABLE 9

| FIELD# | NAME | LTH | FIELD DESCRIPTION |
|---|---|---|---|
| | U-DUT-CTL | | DUT Control Data |
| 1 | TO-SYSID | 8 | Send-to system id |
| 2 | FROM-SYSID | 8 | From system id |
| 3 | FROM-TERMID | 8 | From terminal id |
| | SENT-DATE-TIME | | Sent date/time/sequence |
| 4 | SENT-DATE | | Sent date |
| | SENT-CC | 2 | Sent century |
| | SENT-YY | 2 | Sent year |
| | SENT-MM | 2 | Sent month |
| | SENT-DD | 2 | Sent day |
| 5 | SENT-TIME | | Sent time |
| | SENT-HH | 2 | Sent hour (military) |
| | SENT-MM | 2 | Sent minute |
| | SENT-SS | 2 | Sent second |
| | SENT-HS | 2 | Sent 100th second |
| 6 | SENT-SEQUENCE | 3 | Sent DATE/TIME sequence |
| 7 | RELEASE-NO | 3 | Software release number |
| 8 | filler | 17 | future use |
| | U-DUT-KEY | | DUT Key |
| 9 | U-CCNA-ICSC | 4 | Interexchange Carrier (Customer) |
| 10 | U-ECCKT | 53 | Exchange Company Circuit ID |
| 11 | U-REC-TYPE | 2 | Must be "U". Identifies the record as being a DLR Upload Transaction record. |
| | U-ADMIN-SECTION-DATA | | |
| 12 | U-PON | 16 | Purchase Order Number |
| 13 | U-REFNUM | 4 | Refnum |
| 14 | U-ECIA | 1 | EC Initiated Activity Y = EC Initiated Activity Blank/No entry = ASR Initiated Activity |
| 15 | U-CUST | 20 | IC Customer Name |
| 16 | U-CKR | 53 | IC Circuit Reference |
| 17 | U-COMPANY | 4 | EC Company |
| 18 | U-ORD | 20 | Order Number |
| 19 | U-TSC | 8 | Two Six Code |
| 20 | U-TGID | 11 | Trunk Group Identification |
| 21 | U-CLO | 12 | Circuit Layout Order Number |
| 22 | U-TSP | 2 | Telecommunications Service Priority |
| 23 | U-DSGCON | 15 | Design/Engineering Contact |
| | U-DSGCON-TEL-NO | | Design Contact Telephone Number |
| 24 | U-DSG-TEL-A | 3 | DSG TEL Area Code |
| 25 | U-DSG-TEL-P | 3 | DSG TEL Prefix |
| 26 | U-DSG-TEL-S | 4 | DSG TEL Suffix |
| 27 | U-DSG-TEL-X | 4 | DSG TEL Extension |
| 28 | U-EC-DSGCON | 3 | Designer Contact |
| | U-EC-DSGCON-TEL- | | |

TABLE 9-continued

| FIELD# | NAME | LTH | FIELD DESCRIPTION |
|---|---|---|---|
| | | | NO EC DSGCON Telephone Number |
| 29 | U-EC-DSGCON-TEL-A | 3 | EC DSGCON TEL Area Code |
| 30 | U-EC-DSGCON-TEL-P | 3 | EC DSGCON TEL Prefix |
| 31 | U-EC-DSGCON-TEL-S | 4 | EC DSGCON TEL Suffix |
| 32 | U-EC-DSGCON-TEL-X | 4 | EC DSGCON TEL Extension |
| | U-EC-MCO Maintenance Control Office | | |
| 33 | U-EC-MCO-A | 3 | EC MCO Area Code |
| 34 | U-EC-MCO-P | 3 | EC MCO Prefix |
| 35 | U-EC-MCO-S | 4 | EC MCO Suffix |
| 36 | U-EC-MCO-X | 4 | EC MCO Extension |
| | U-EC-OCO Operations Control Office | | |
| 37 | U-EC-OCO-A | 3 | EC OCO Area Code |
| 38 | U-EC-OCO-P | 3 | EC OCO Prefix |
| 39 | U-EC-OCO-S | 4 | EC OCO Suffix |
| 40 | U-EC-OCO-X | 4 | EC OCO Extension |
| | U-DLRD | | Design Layout Report Date |
| 41 | U-DLRD-MO | 2 | DLRD Month |
| 42 | U-DLRD-DAY | 2 | DLRD Day |
| 43 | U-DLRD-YR | 2 | DLRD Year |
| | U-CDLRD | | Confirming Design Layout Report Date |
| 44 | U-CDLRD-MO | 2 | CDLRD Month |
| 45 | U-CDLRD-DAY | 2 | CDLRD Day |
| 46 | U-CDLRD-YR | 2 | CDLRD Year |
| | U-PTD | | Plant Test Dat |
| 47 | U-PTD-MO | 2 | PTD Month |
| 48 | U-PTD-DAY | 2 | PTD Day |
| 49 | U-PTD-YR | 2 | PTD Year |
| | U-DD | | Due Date |
| 50 | U-DD-MO | 2 | DD Month |
| 51 | U-DD-DAY | 2 | DD Day |
| 52 | U-DD-YEAR | 2 | DD Year |
| 53 | U-REMARKS | 186 | Remarks |
| 54 | Filler | 65 | future use |
| | U-DESIGN-SEQ-LIST-DATA | | |
| | U-DESIGN-SEQ-LIST-DATA-LVL occurs 52 times | | |
| 55 | U-DS-NOTE-IND | 1 | Note Indicator |
| 56 | U-LOCATION | 11 | Location |
| 57 | U-EQPT-FAC | 18 | Equipment and Facility |
| 58 | U-SV2 | | Signal/Voice Path Type |
| 59 | U-Z-A | 5 | Transmission Level Point (TLP) — Z to A Direction |
| 60 | U-A-Z | 5 | Transmission Level Point (TLP) — A to Z Direction |
| | U-INC-MI Incremental Mileage | | |
| 61 | U-INC-MI-1-5 | 5 | INC MI 1 5 |
| 62 | U-INC-MI-TYPE | 1 | INC MI Type |
| 63 | U-MISC | 16 | Miscellaneous Information |
| 64 | filler | 20 | future use |
| | U-WORKSHEET-ADD-NOTES-DATA | | |
| | U-WORKSHEET-ADD-NOTES-LVL occurs 20 times | | |
| 65 | U-AN-NOTE-IND | 1 | AN Note Indicator |
| 66 | U-NOTES-ON | 49 | Notes ON |
| 67 | filler | 10 | future use |
| | U-DESIGN-INFORMATION-DATA | | |
| 68 | U-LT | 1 | LT |
| 69 | U-SLC | 2 | SLC |
| 70 | U-ACTL | 11 | Access Customer Terminal Location |
| 71 | U-APOT | 11 | Additional Point of Termination |
| 72 | U-CKLT | 11 | Circuit Bridging Location |
| | U-TCIC | | TCIC |
| 73 | U-TCIC | 1 | 5 TCIC1 |
| 74 | U-TCIC | 2 | 5 TCIC2 |
| 75 | U-NC | 4 | Network Channel Code |
| 76 | U-NCI | 12 | Network Channel Interface Code |
| | U-TLV | | Transmission Level Point |
| 77 | U-TLV-T | 5 | TLV T |
| 78 | U-TLV-R | 5 | TLV R |
| | U-CSPC | | CSPC |
| 79 | U-CSPC1 | 3 | CSPC1 |
| 80 | U-CSPC2 | 3 | CSPC2 |
| 81 | U-CSPC3 | 3 | CSPC3 |
| 82 | U-SECNCI | 12 | Secondary Network Channel Interface Code |
| | U-SECTLV | | Secondary Transmission Level Point |
| 83 | U-SECTLV-T | 5 | SECTLV T |
| 84 | U-SECTLV-R | 5 | SECTLV R |
| 85 | U-MI | 2 | Machine Interface Code |
| | U-ECSPC | | ECSPC |
| 86 | U-ECSPC | 1 | 3 ECSPC1 |
| 87 | U-ECSPC | 2 | 3 ECSPC2 |
| 88 | U-ECSPC | 3 | 3 ECSPC3 |
| 89 | filler | 56 | future use |
| | U-DI-PRIMARY-LOCATION-SECTION | | |
| 90 | U-PRILOC | 25 | Primary Location |
| 91 | U-SPOT-PRIMARY | 11 | Secondary Location Point of Termination — Primary |
| 92 | U-DI-STREET-PRI | 25 | End User Street Address |
| 93 | U-DI-BLDG-PRI | 9 | End User Building |
| 94 | U-DI-FLR-PRI | 9 | End User Floor |
| 95 | U-DI-ROOM-PRI | 9 | End User Room |
| 96 | U-DI-CITY-PRI | 25 | End User City |
| 97 | U-DI-STATE-PRI | 2 | End User State |
| 98 | U-DI-TERM-PRI-1 | 15 | End User Termination PRI 1 |
| 99 | U-DI-SV-PRI-1 | 2 | End User Signal/Voice Path Type PRI 1 |
| 100 | U-E-RCV-PRI-1 | 5 | End User Receive Level PRI 1 |
| 101 | U-EXMT-PRI-1 | 5 | End User Transmit Level PRI 1 |
| 102 | U-DI-TERM-PRI-2 | 15 | End User Termination PRI 2 |
| 103 | U-DI-SV-PRI-2 | 2 | End User Signal/Voice Path Type PRI 2 |
| 104 | U-E-RCV-PRI-2 | 5 | End User Receive Level PRI 2 |
| 105 | U-EXMT-PRI-2 | 5 | End User Transmit Level PRI 2 |
| 106 | filler | 55 | Future use |
| | U-DI-SECONDARY-LOCATION-SECT | | |
| 107 | U-SECLOC | 25 | Secondary Location |
| 108 | U-SPOT-Secondary | 11 | Secondary Location Pt of Termination — Secondary |
| 109 | U-DI-STREET-SEC | 25 | End User Street Address SEC |
| 110 | U-DI-BLDG-SEC | 9 | End User Building SEC |
| 111 | U-DI-FLR-SEC | 9 | End User Floor SEC |
| 112 | U-DI-ROOM-SEC | 9 | End User Room SEC |
| 113 | U-DI-CITY-SEC | 25 | End User City SEC |
| 114 | U-DI-STATE-SEC | 2 | End User State SEC |
| 115 | U-DI-TERM-SEC-1 | 15 | End User Termination SEC 1 |
| 116 | U-DI-SV-SEC-1 | 2 | End User Signal/Voice Path Type SEC 1 |
| 117 | U-E-RCV-SEC-1 | 5 | End User Receive Level SEC 1 |
| 118 | U-EXMT-SEC-1 | 5 | End User Transmit Level SEC 1 |
| 119 | U-DI-TERM-SEC-2 | 15 | End User Termination SEC 2 |
| 120 | U-DI-SV-SEC-2 | 2 | End User Signal/Voice Path Type SEC 2 |
| 121 | U-E-RCV-SEC-2 | 5 | End User Receive Level SEC 2 |
| 122 | U-EXMT-SEC-2 | 5 | End User Transmit Level SEC 2 |
| 123 | filler | 55 | future use |
| 124 | filler | 32 | future use |

In response to the DLR upload transaction 64 initiated by CIRAS 14, ARMS 12 generates DLR upload response transactions denoted at block 66 of FIG. 2. The DLR upload response transactions 66 send one response file record as a response for each DLR upload transaction file record contained in transaction 64. Each response file record contains either a message accepting the DLR upload transaction file record, or a set of error messages associated with the design layout record. For example, error messages can be sent indicating that the DLR needs to be resent to ARMS, or that the DLR was rejected. In cases of rejection, error messages are sent from ARMS 12 specifying edit errors in the DLR administration section, and the DLR design section, for example.

Figure 3:
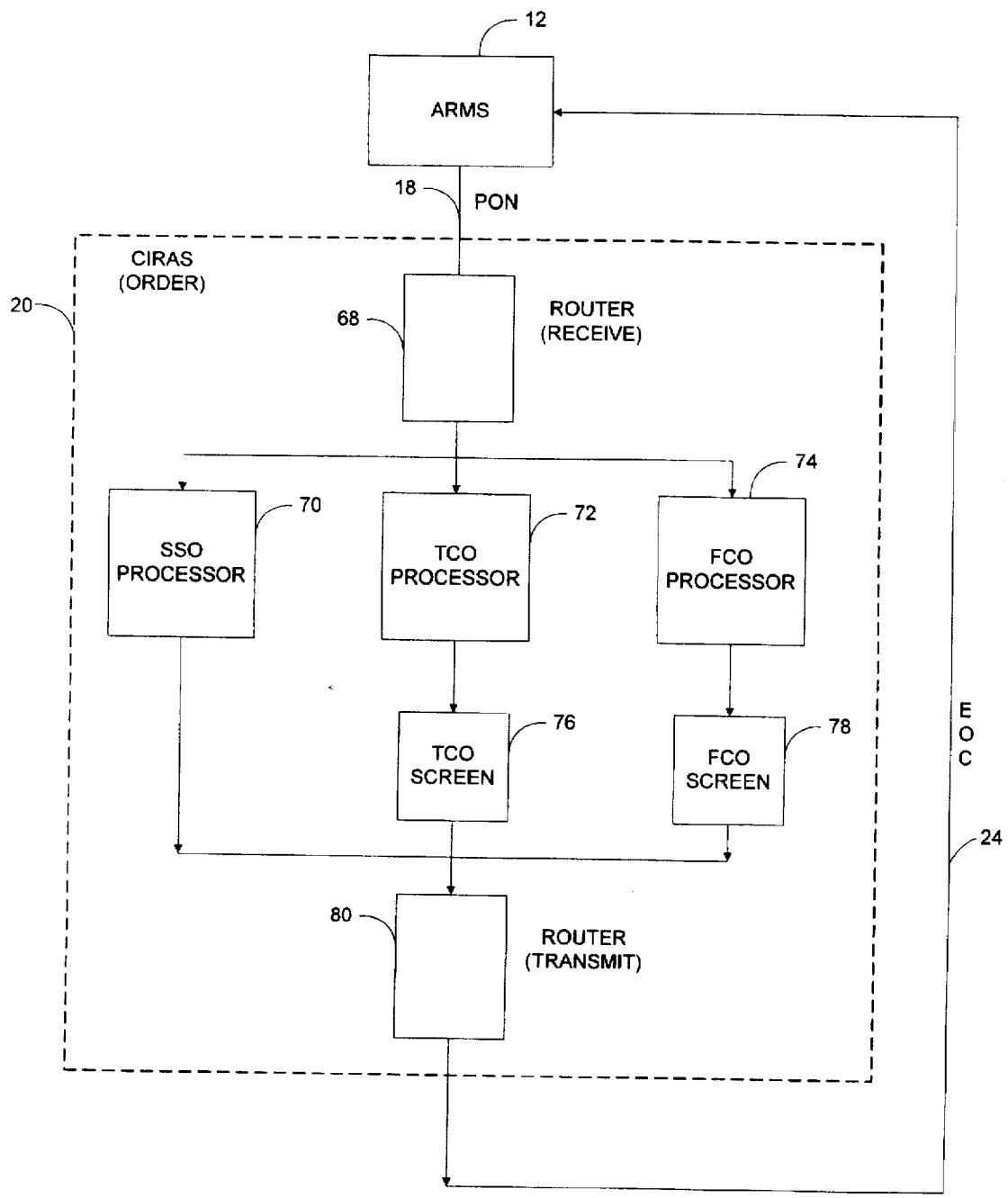
FIG. 3 is a block diagram illustrating the circuit order interface flow for the system shown in FIG. 1.

FIG. 3 is a block diagram illustrating the circuit order interface flow for the telecommunications circuit provisioning and administration system 10 shown in FIG. 1. In particular, FIG. 3 illustrates further details of the CIRAS order functions component 20 of CIRAS 14. As shown in FIG. 3, ARMS 12 communicates provisioning data packets identified by PONs to a receive router 68. The receive router is capable of determining which type of circuit order (SSO, TCO or FCO) has been received. Depending on the type of circuit order, the router 68 will transmit the information contained in the provisioning data packets to one of three processors. As shown in FIG. 3, CIRAS order functions component 20 includes an SSO processor 70, a TCO processor 72, and an FCO processor 74. As described in greater detail below in connection with FIG. 4, the processors 70, 72 and 74 process the information contained in the provisioning data packets and generate EOC messages of the type explained above. Generally, order processors 70, 72 and 74, among other functions, determine whether an order relating to a telecommunications circuit requests a new circuit, a change to an existing circuit, or cancellation of an existing circuit.

In connection with the processing of TCOs and FCOs, a TCO processing screen flow 76 and an FCO processing screen flow 78 are shown. These are included in FIG. 3 to indicate that a manual validation check is performed by CIRAS personnel before EOC messages for TCOs and FCOs are sent to ARMS 12. By contrast, EOC messages for SSOs do not require a manual validation check, and are thus generated immediately after receipt of circuit orders from ARMS 12. As shown in FIG. 3, the outputs of processor 70 and processing screen flow components 76 and 78 feed into a transmit router 80. The transmit router 80 transmits the EOC messages generated by CIRAS 14 to ARMS 12.

Figure 4:
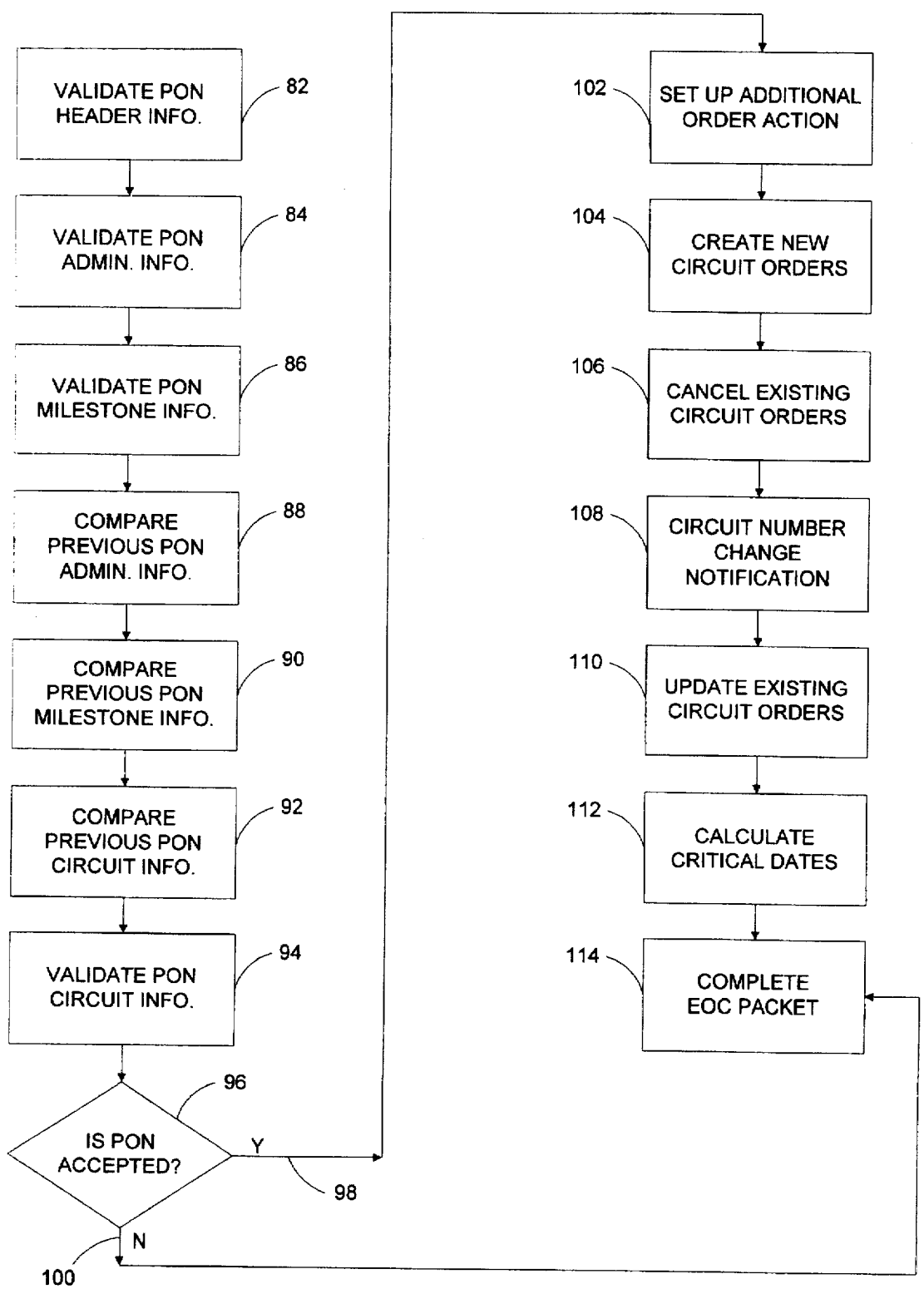
FIG. 4 is a more detailed flow diagram illustrating the background order process flow for the interface flow shown in FIG. 3.

FIG. 4 is a detailed flow diagram illustrating the order process flow for the circuit order interface flow shown in FIG. 3. The process flow of FIG. 4 applies to all types of circuit orders, i.e., SSOs, TCOs and FCOs. As explained above in connection with FIG. 3, a provisioning data packet identified by a PON is received by router 68 which then routes the information to the applicable order processor. Once in an order processor, the process flow shown in FIG. 4 begins. First, the various types of PON information are validated. As shown in FIG. 4, in the first step 82, the PON header information is validated. Next, in step 84, the PON administrative information is validated, and then the PON milestone information is validated in step 86. If an error is detected in any of these validation steps 82, 84 or 86, the PON will not be accepted and appropriate error messages will be transmitted to ARMS 12.

When the validation steps are completed, the various order processors compare the current PON information with the last version of that PON previously sent by ARMS 12. In other words, ARMS 12 frequently sends provisioning data packets identified by an existing PON in order to change or update the circuit order information associated with that PON. In this situation, it is necessary for the order processors of CIRAS 14 to determine the particular changes made to circuit orders associated with an existing PON. For example, if ARMS 12 transmits a PON to CIRAS 14 at the beginning of a week, it may then send the PON to CIRAS 14 again two days later if the customer ordered changes to the circuits associated with that PON. In this instance, CIRAS 14 has two different versions of the file for that PON. CIRAS 14 must determine what changes were made to the provisioning data associated with that PON. Thus, in step 88, the current version of a PON is compared with the previous version of the PON to compare the administrative information in the provisioning data packet. Then, as shown in step 90, the current milestone information is compared with the previous milestone information associated with that PON. Finally, at step 92, the current circuit information is compared with the previous circuit information of that PON to identify what changes, if any, were made. During this comparison process, CIRAS 14 produces automated remarks that inform a remote location implementing the circuit orders of every field that was changed, and exactly what changes occurred.

An important aspect of the present invention is the ability of CIRAS 14 to keep track of the various PONs and the changes made to PONs over time. This feature is particularly important for tracking changes to circuit information. In step 92 of FIG. 4, the circuit information of a new PON version is compared with an existing version of the same PON to determine whether the new PON relates to a new circuit order, or changes to or cancellation of an existing order.

Table 10 shown below illustrates the comparison process that CIRAS 14 performs for comparing circuit information according to step 92 of FIG. 4:

TABLE 10

| NEW PON VERSION | | | EXISTING PON | | |
|---|---|---|---|---|---|
| REF NUM | CKT ID | LEG ACT. | REF NUM | CKT ID | LEG ACT. |
| 1 | A* | (N)EW | 1 | A* | (N)EW |
| 2 | C* | (C)HANGE | ~~2~~ | ~~B~~ | ~~(C)HANGE~~ |
| 3 | D | (N)EW | 3 | C* | (D)ISCNCT |
| 4 | F | (N)EW | 4 | D | (K)ILL/ CANCEL |
| 5+ | H | (C)HANGE | 5+ | E | (N)EW |
|  |  |  | ~~6~~ | ~~G~~ | ~~(D)ISCNCT~~ |

In step 92, the order processors determine if existing versions of a particular PON exist. A table similar to Table 10 shown above is generated to identify the particular circuit order changes. For each circuit order associated with that PON, the data in the columns of Table 10 is updated. As can be seen, there are two components of the circuit information comparison table: one set of columns for the new version of the PON and another set of columns for the existing version of the PON. Three columns of information are generated for each PON version: a reference number column, a circuit identification column, and a Leg activity column. The PON activity can be divided into four categories: (1) a new PON and therefore all new circuit activity or an existing PON but new circuits on the PON, (2) circuit number changes, (3) updates/changes to circuit information, and (4) delete/cancel of circuits. As part of the comparison process, certain comparison rules are implemented to determine the changes that have occurred between the new version of the PON and the existing version. These comparison rules can be summarized as follows:

1. Find circuit ID matches and changed reference numbers.
2. Find reference number matches and circuit number changes.
3. Find new circuit IDs and their Leg activity requests.
4. Find missing Cancel Legs.

In the example illustrated in Table 10, the following actions are processed by the comparison circuit process step 92 of FIG. 4. First, referring to the existing PON table, existing PON leg activity "kill/cancels" are never considered for comparison. Therefore, in Table 10, Reference No. 4 in the new version table will not be considered as a "circuit number change" request. As for the actual comparison rules, the circuit IDs are first matched. Therefore, in Table 10, Reference No. 1 in the new PON version corresponding to circuit A is an update to Reference No. 1 on the old version. Reference No. 2 on the new PON version corresponding to circuit C is an update to Reference No. 3 on the old version. Under the second comparison rule, circuits already matched are excluded and reference number matches are searched. Therefore, in the example of Table 10, Reference No. 5 on the new PON version corresponding to Circuit H is a circuit number change to Reference No. 5 on the old version corresponding to Circuit E. Third, the circuit and reference number matches are excluded and implied additions (i.e., new circuit IDs) are searched. In Table 10, Reference Nos. 3 (circuit D) and 4 (circuit F) on the new PON version are new additions. Finally, the comparison process excludes circuit matches and reference number matches and searches for implied deletes (i.e., missing Cancel Legs). In the example, as can be seen, Reference Nos. 2 (circuit B) and 6 (circuit G) of the existing PON version are deletes.

Following the completion of comparison process steps 88, 90 and 92, the PON circuit information is validated as indicated in block 94 of FIG. 4. Thereafter, as indicated by decision block 96, because the validation and comparison processes have been completed, a determination is made as to whether the PON has been accepted. If the PON has not been accepted, CIRAS 14 will transmit an EOC message specifying the particular problem with the PON. This process flow is described in FIG. 4 at line 100 which connects to block 114 designating the completion of an EOC packet. If the PON has been accepted as shown by line 98, then the order processing flow continues as explained below.

First, as indicated in block 102, the order processors set up additional order actions. In other words, if a particular PON requires that certain action be taken with respect to a circuit, step 102 would set up two order actions for the circuit. For example, a particular PON may require that a circuit ID be changed for an existing circuit. Because the circuit has already been implemented under the incorrect circuit ID, two order actions will be required to change the circuit ID: (1) delete old circuit, and (2) create new circuit. These order action setups are performed at step 102.

Next, if a PON requests a new circuit, step 104 will create new circuit orders for each circuit in a PON. At step 106, existing circuit orders are canceled if that action is requested in a PON. Following this, at step 108, the process provides a circuit number change notification for specific circuits on a PON if that is part of the requested action. Thereafter, existing circuit orders are updated as required at step 110. Then, CIRAS 14 calculates critical dates as indicated in step 112 which are internal engineering deadline dates established by CIRAS 14 in relation to the milestone dates designated by ARMS 12. Finally, as shown in step 114, EOC packets are completed by generating a trailer record. The EOC messages are sent to ARMS in the manner discussed above in connection with FIGS. 1–3.

In connection with the order processing described above and as illustrated in FIG. 4, CIRAS 14 follows several rules in processing the orders. These rules can be summarized as follows:

1. If CIRAS 14 receives a new order, correction order, or a cancel order for a PON, and the transaction is rejected by the applicable order processor, then no changes will occur to any existing CIRAS data.

2. If CIRAS receives a new order with confirmation and it is determined that the PON already exists in CIRAS, then the order will be rejected with the following error messages:
   a. "Initial (I) PON add was requested, but PON already exists," and
   b. "Resend (R) to confirm, or send as correction (C)."
3. If CIRAS receives a new order without confirmation, and it is determined that the PON already exists in CIRAS, then the order will be accepted and processed as a correction order without confirmation.
4. If CIRAS receives a cancel order and it is determined that the PON does not exist in CIRAS, then the order will be rejected with the following error message: "Cancel (K) requested, but PON not found."
5. If CIRAS receives a cancel order with confirmation but the header record REQ-MODE is set for Correction (C), then the order will be rejected with the following error message: "SUPP 1 found on Correction (C). Resend (R) to confirm cancel."
6. If CIRAS receives a correction order with confirmation, and it is determined that the PON does not exist in CIRAS, then the order will be rejected with the following error messages:
   a. "Correction (C) requested, but PON not found"; and
   b. "Resend (R) to confirm new PON, or send as initial (I)."
7. If CIRAS receives a correction order without confirmation, and it is determined that the PON does not exist in CIRAS, then the order will be accepted and processed as a new order without confirmation.
8. If CIRAS receives a cancel order, then all circuit orders will be canceled for the PON, subject to the above rules.

Further details of the logistics of the error processing performed in CIRAS 14 will now be described. Under normal processing, ARMS 12 sends CIRAS 14 an order. CIRAS 14 validates the order with no errors and sends an EOC message back to ARMS 12 indicating acceptance of the order. In a situation involving normal processing with a confirmation step, there are two possibilities. First, CIRAS 14 may have detected a change to an order indicative of some type of miscommunication between CIRAS 14 and ARMS 12. Alternatively, normal processing with a confirmation step could be indicative of a situation in which CIRAS 14 detects a change having great impact on the CIRAS circuit data, i.e., "mass change" processes. Examples of the first type of transaction requiring the confirmation step include situations similar to that mentioned above in Rules 2, 4, or 7, where ARMS 12 sends an order for a new PON but CIRAS 14 already has that PON, or where ARMS 12 sends an update for a PON that CIRAS 14 should already have but CIRAS 14 does not have it. Under both of these situations, CIRAS 14 will ultimately accept the order on a resend. However, the first attempt at processing will result in an EOC rejection posted to the ARMS error log. In the first situation, possible causes of the problem could be that the ICSC representative simply entered the wrong PON. Alternatively, it is possible that CIRAS 14 has some existing circuit orders which reference an incorrect PON, in which case an engineer should correct the circuit order in error so that the proper PON from ARMS 12 will not be combined with corrupted data in CIRAS 14. In either of these cases, ARMS 12 would be required to resend the order after error resolution, since the initial send of the order concluded with an EOC rejection.

An example of the "mass change" type of transaction requiring the confirmation step is a circuit number change request. In this situation, ARMS 12 sends an order to CIRAS 14 which CIRAS 14 validates and processes normally. Thereafter, ARMS 12 might send a correction order which references a different circuit identification for a reference number received on the previous version. CIRAS 14 is capable of making the circuit number change, but doing so will result in mass changes to all active circuit orders referencing the circuit, all existing master and special circuits for the circuit, and all facilities the circuit is positioned on. Therefore, CIRAS 14 verifies that the change was intentional, and does so by sending ARMS 12 an EOC rejection on the first receipt of a circuit number change request. Again, an ICSC representative at ARMS 12 must resend the order to confirm that a circuit number change was intended.

In the circuit number change process, it should be understood that CIRAS 14 cannot detect a circuit number change unless one order transmission from ARMS 12 has already been received and accepted. Unless this has occurred, CIRAS has nothing to compare reference numbers against, or to detect that the circuit number for a reference number has changed.

To illustrate a circuit number change process, assume ARMS 12 has an order to change an existing circuit requiring processing by CIRAS 14. An ICSC representative at ARMS 12 enters the order using the circuit numbers believed to be correct. CIRAS 14 receives the Order and determines that the circuit IDs are not on file, and thus sends ARMS an EOC rejection notice. The EOC rejection notice prompts an ICSC representative to contact CIRAS engineering personnel to determine the problem with the circuit. Engineering discovers that the circuit does exist, but by a different name than the one sent on the order. At this point, the ICSC representative must perform the following acts to accomplish a circuit number change without requiring engineering assistance: (1) send CIRAS a correction order referencing the circuits by the identification known to CIRAS; (2) send CIRAS a correction order referencing circuits by the identification desired by ARMS; and (3) resend the correction order to confirm that a circuit number change was intended. Alternatively, if ICSC is willing to coordinate with engineering, they could perform the following acts: (1) contact engineering and ask that engineering use special ICSC authority to perform a circuit number change; and (2) resend the order. In summary, it is important to note that final resolution to a problem is initiated by ARMS 12. CIRAS engineering personnel may correct a problem in CIRAS, but CIRAS does not initiate correction orders. Therefore, unless ICSC re-sends orders which appear in the ARMS error log with an EOC rejection notice, ARMS 12 will be out-of-sync with CIRAS 14, not actually knowing whether CIRAS 14 corrected the error issues.

The error processing conducted by CIRAS 14 is also capable of detecting data integrity problems. Such error processing occurs when ARMS 12 sends CIRAS 14 an order and CIRAS 14 detects data integrity problems which must be corrected before the order can be processed. The corrupted data could exist in either ARMS 12 or CIRAS 14. An example of data integrity problems requiring error processing is an order which contains a Leg activity request of "Change Leg" for a circuit ID that CIRAS does not have on file. In this case, CIRAS 14 cannot process the order until it is determined whether: (1) the circuit ID is incorrect on the order, (2) the circuit ID is correct, but not in the circuit files of CIRAS, or (3) the circuit ID is correct, but CIRAS knows the circuit by a different name. Under the first scenario, ICSC would correct the problem using ARMS 12 and then resend the order to CIRAS 14. In the second scenario, CIRAS-based engineering personnel would correct the problem using CIRAS 14, and then ICSC would resend the order to CIRAS 14. In the third scenario, the problem could be corrected by either ICSC or CIRAS engineering using either system.

As part of the error processing performed by background order processors 70, 72 and 74 shown in FIG. 3, CIRAS 14 generates several different categories of error processing messages. One category consists of informational messages sent by CIRAS 14 in the EOC packet. These informational messages have no effect on whether the provisioning data packet will be accepted or rejected as indicated in the EOC packet. However, the messages do provide certain information on the status of the circuit orders contained in a provisioning data packet. Examples of the informational messages provided by CIRAS include: (1) provisioning data packet accepted; (2) provisioning data packet rejected; (3) FCO portion of PON waiting on SSO approval (i.e., occurs when an entire PON has been rejected because SSO errors are present even though the facility portion of a PON is acceptable); (4) FCO portion of PON waiting on TCO approval; (5) secondary location not found; (6) primary location not found; (7) duplicate circuit ignored, etc. Those skilled in the art are familiar with the different types of informational messages that may exist with respect to provisioning data.

Another category of order processing errors are soft error messages. Soft error messages are actually warnings, although a provisioning data packet with a soft error message is rejected. However, the soft errors can be ignored if ARMS performs a resend of the identical provisioning data packet. An EOC message for a provisioning data packet contains this type of error message only when a PON is dispatched initially or re-dispatched (i.e., sending a change or correction to an existing PON and informing CIRAS of the change or correction for the first time). Examples of soft error messages include: (1) circuit leg already completed on SSO number, TCO number or FCO number requiring a new PON; (2) initial PON add was requested but PON already exists; (3) correction requested but PON not found; (4) resend to confirm new PON or send as initial PON; (5) circuit ID for reference number in conflict with previous version of PON; (6) reference number exists in CIRAS for this PON but was not found in this provisioning data packet, etc.

The third type of error processing messages are critical error messages resulting in rejections. When an EOC message contains an error of this type the provisioning data packet was rejected for a reason requiring manual intervention for correction. Critical error messages require that the provisioning data packet be processed again. Examples of critical error messages include instances where the PON needs correction in ARMS, a validation table in CIRAS requires updating, various types of identification information is invalid, milestone dates are invalid, circuit type is invalid, and various additional circuit design parameters are invalid. As should be understood, many of the critical error messages are identified and generated in the validation processing steps 82, 84, 86 and 94 explained above in connection with FIG. 4.

The final type of error processing messages are system error messages. The nature of system error messages are so severe that the EOC packet cannot be built. System error messages are viewable in the batch error log in CIRAS. System errors have nothing to do with the business function or logic, but rather the system software, databases, network, and/or hardware. System error messages are process terminating, which essentially means that ARMS 12 will not see these errors. Thus, system errors must be viewed via the CIRAS exception log displays. CIRAS 14 would be prompted to search the batch error log file if ARMS informs CIRAS that a provisioning data packet was previously sent and the provisioning data packet can be found on the CIRAS receive log, but corresponding information for the provisioning data packet cannot be found on the CIRAS sent log or the sent log information is incomplete, i.e., the sent trailer is missing.

Figure 5:
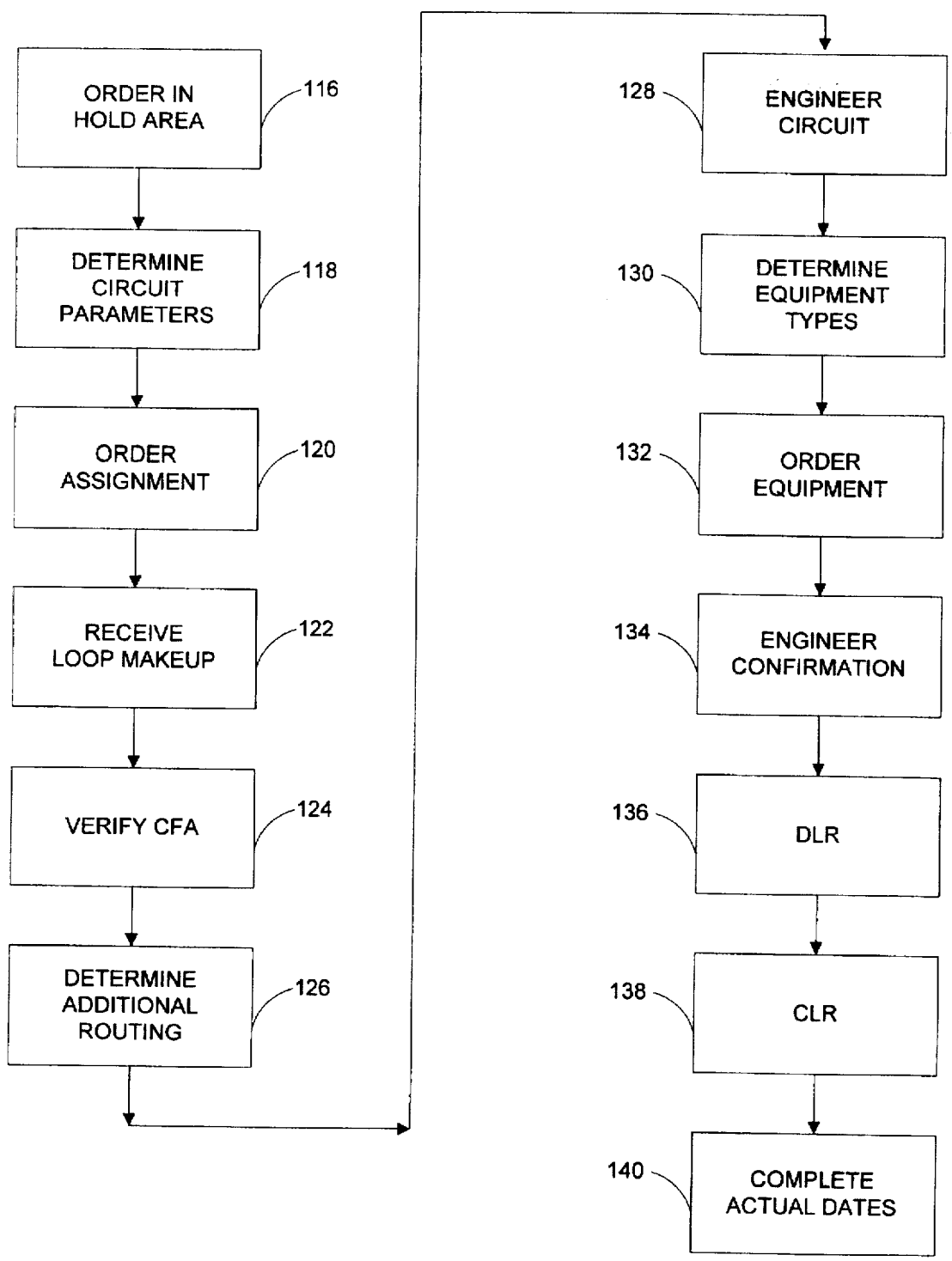
FIG. 5 is a flow diagram illustrating the software-assisted engineering process flow for special service orders.

As mentioned previously, an important feature of the present invention is the ability of CIRAS 14 to generate automated circuit layout records for the telecommunications circuit orders contained in a provisioning data packet. The circuit layout records basically comprise a computer-generated engineering design record containing design parameters for a telecommunications circuit order. FIG. 5 is a flow diagram illustrating the software-assisted engineering process flow for special service circuit orders. In the following discussion, it should be understood that many of the processing steps and details relating to SSOs are common also to TCOs and FCOs. Thus, the following description of the software-assisted engineering process for SSOs generally applies to TCOs and FCOs, although certain specific details relating to TCOs and FCOs will be provided below.

In the initial step of the process flow, an order is placed in a hold area (ASR) as indicated at step 116 of FIG. 5. In this step, edits are cleared in both ARMS 12 and CIRAS 14, and CIRAS 14 accepts the order. In step 118, the circuit parameters for a circuit order are determined. In this step, both the primary and secondary network channel (NC) codes and network channel interface (NCI) codes are determined. Additionally, the system populates the loop and assignment makeup (LAM) date. In step 120, an order assignment is made. The order assignment can be automatic, an analyst can make the assignment, or an engineer can self-assign the order. Next, in step 122, CIRAS 14 receives the loop makeup. The loop makeup includes the associated loss and characteristics, and should be accomplished prior to selection of central office equipment. The loop makeup must include the common language location identifier (CLLI) code of the customer location. Following this step, the carrier facility assignment (CFA) facility code is verified in step 124. In this step, CIRAS 14 determines whether the CFA is from its own company or that of another company. The verification step also determines if the CFA matches a facility in its own system.

In step 126, additional routing is determined. In this step, CIRAS 14 will determine the most efficient routing among the following choices: direct origination point (A) to termination point (Z), A to data acquisition and control system (DACS) to Z, or A to Z with back to back. The next step in the software-assisted engineering process flow is the engineering of the circuit itself as indicated in step 128. For purposes of engineering a SSO circuit, the following information must be available: network priority code, equipment (office and customer), type (FX, FD, FA, LG, DID), network channel code, network channel interface code, secondary network channel interface code, end user customer address, far end/bridge of origination point, serving office of termination point, dates (both due and critical), loop makeup, master circuit, and expected measure of loss (EML). In accordance with the present invention, all of these parameters are automatically selected and engineered for a particular circuit order.

Once the circuit has been engineered, equipment types are determined in step 130. Here, the customer premise equipment is determined along with the office equipment. Any external requirements are also determined. In step 132, the required equipment is ordered. These requirements are identified and requisitions are issued upon the actual record issue date (ARID). The ARID is also automatically populated with the system date and time. Next, the automated circuit design is confirmed by an engineer as indicated in step 134. In this step, the circuit is either approved or rejected by an engineer. If rejected, a decision is made on the aspects of the design requiring change, and any changes are processed.

If the circuit is approved, then the process continues to generate the automated design layout record which is transmitted to ARMS 12 as indicated in step 136. The design layout record is automatically generated after ARID. Thereafter, the automated circuit layout record is generated in step 138. Distribution of the circuit layout record is determined by the office involved and the network channel codes. As the final step in the automated engineering process, the ARID dates are completed. Here, error dates are completed and material requisitions are sent.

As stated above, the automated engineering process flow discussed above also generally applies to TCOs and FCOs. With respect to TCOs, certain additional points should be noted. First, the TCO order is received with a carrier facility assignment and an ECCKT. In this step, a decision/search for channel type is made over all existing spares. The system selected is based on access; if there is not access, then the next available system is selected. In order to perform software-assisted engineering for TCOs, the following parameters are determined: location A, location Z, TSC, CSPC, quantity (trunk range), critical dates, NC/NCI, CFA, traffic use, traffic class, office class, modifier, pulsing, TCIC (if SS7), and diversity. Moreover, in certain instances CIRAS 14 will bypass software-assisted engineering for trunk circuit orders. For example, if switch A or switch Z is analog, then the circuit layout record will be manually engineered. Additionally, if the facility is analog, then the circuit will be manually engineered. Also, only trunks that are wholly-owned by the system's operating company will be designed through software-assisted engineering; otherwise, any trunk circuit design to another local exchange carrier will be manual.

For facility circuit orders, the following facility data parameters are determined in the software-assisted engineering process: location A, location Z, quantity, NC/NCI, secondary NCI, NPC-diversity, CFA (access), and customer. Certain limitations also apply for software-assisted engineering of facility circuit orders. First, software-assisted engineering will be performed only if one route is available; otherwise, manual design will be performed. Also, the system will utilize software-assisted engineering only if spare equipment is available. CIRAS 14 also provides the option of rejecting the automated facility circuit design and manually engineering the design. If there is a facility disconnect order, the circuit must be removed before the system disconnect can be completed. Also, spare channels on a disconnected system must be marked pending disconnect so they will not be selected for new assignment.

Through the above-described software-assisted engineering process, the system of the present invention provides significant advantages over existing provisioning systems. Namely, the ability to provide automated circuit layout and design layout records substantially reduces the amount of manual intervention currently required for circuit design. Consequently, these automated records are provided more efficiently and with reduced costs in both time and resources. This measured efficiency arises from the capability of the present invention to monitor and keep track of circuit components and equipment and automatically select the available components and equipment required to fulfill circuit orders.

As is evident from the foregoing description, the present invention provides a telecommunications circuit provisioning and administration system that accepts circuit orders from an order entry system operating on a mainframe computer system and generates engineering order confirmation messages from a circuit administration system which runs on a distributed platform. The engineering order confirmation messages immediately inform the order entry system whether the circuit orders were accepted as sent or if the circuit order was rejected. The present invention also is capable of producing automated circuit layout records for telecommunications circuit orders and automatically transmitting these circuit layout records to field personnel for circuit implementation. Finally, the present invention produces automated design layout records which contain information relating to the circuit design parameters. These design layout records are automatically transmitted back to the order entry system. The above information exchange is possible through the interface of the present invention, which is capable of providing real-time communications relating to circuit orders between mainframe and distributed computer systems.

We claim:

1. A telecommunications circuit provisioning and administration system for providing telecommunications service comprising:

an access request management component which receives access service requests for a plurality of different types of telecommunications circuits including special service circuits, processes the access service requests, and produces provisioning data packets containing information relating to the requested telecommunications circuits, a plurality of the provisioning data packets including orders relating to a telecommunications circuit;

an interface connected to the access request management component for transmitting information to and from the access request management component, the interface capable of exchanging information with a distributed computer system; and a circuit administration component that operates on the distributed computer system connected to the interface, wherein the circuit administration component receives the provisioning data packets from the access request management component through the interface, processes the information contained in the provisioning data packets, generates order confirmation messages containing information relating to the status of the telecommunications service ordered in the access service requests, communicates the order confirmation messages to the access request management component through the interface, and produces automated circuit layout records for telecommunications circuit orders contained in the provisioning data packets.

2. The system as defined in claim 1 wherein the automated circuit layout records comprise computer-generated engineering design records containing design parameters for telecommunications circuit orders.

3. The system as defined in claim 1 wherein the circuit administration component generates automated design layout records containing design parameters for the telecommunications circuit orders, and wherein the design layout records are communicated to the access request management component.

4. The system as defined in claim 1 wherein the circuit administration component communicates the automated circuit layout records to a remote location for implementation of the telecommunications circuit orders in accordance with the circuit layout records.

5. The system as defined in claim 1 wherein the access request management component operates on a mainframe computer system.

6. The system as defined in claim 1 wherein the interface is capable of communicating information between a mainframe computer system and a distributed computer system.

7. The system as defined in claim 1 wherein the interface comprises an application programming interface (API) in conjunction with a TCP/IP network.

8. The system as defined in claim 1 wherein the different types of telecommunications circuits include special service circuits, trunk circuits, and facility circuits.

9. The system as defined in claim 8 wherein the special service circuits include telephone circuits and serial circuits.

10. The system as defined in claim 1 wherein the provisioning data packets include administrative data, milestone data, and circuit data.

11. The system as defined in claim 1 wherein each provisioning data packet includes orders relating to a plurality of telecommunications circuits.

12. The system as defined in claim 1 wherein the order confirmation messages indicate whether the telecommunications circuit orders contained in the provisioning data packets have been accepted, or whether errors are present in the provisioning data packets and the nature of the errors.

13. The system as defined in claim 1 wherein the circuit administration component includes a design processor for generating the circuit layout records.

14. A telecommunications circuit provisioning and administration system for providing telecommunications service comprising:

an access request management component which receives access service requests for a plurality of different types of telecommunications circuits, processes the access service requests, and produces provisioning data packets containing information relating to the requested telecommunications circuits, each provisioning data packet including at least one order relating to a telecommunications circuit;

an interface connected to the access request management component for transmitting information to and from the access request management component, the interface capable of communicating information between a mainframe computer system and a distributed mid-range computer system; and a circuit administration component connected to the interface, wherein the circuit administration component receives the provisioning data packets from the access request management component through the interface, processes the information contained in the provisioning data packets, generates order confirmation messages containing information relating to the status of the telecommunications service ordered in the access service requests, communicates the order confirmation messages to the access request management component through the interface, and produces automated circuit layout records for telecommunications circuit orders contained in the provisioning data packets, wherein the circuit administration component includes a plurality of order processors each associated with a different type of telecommunications circuit for processing the information contained in the provisioning data packets and generating the order confirmation messages.

15. The system as defined in claim 14 wherein the order processors determine whether an order relating to a telecommunications circuit requests a new circuit, a change to an existing circuit, or cancellation of an existing circuit.

16. The system as defined in claim 15 wherein the circuit administration component includes a receive router connected between the interface and the order processors for receiving the provisioning data packets from the interface and routing the provisioning data packets to the appropriate order processor associated with a particular type of telecommunications circuit.

17. The system as defined in claim 16 wherein the circuit administration component includes a transmit router connected to the order processors for transmitting the order confirmation messages from the order processors to the access request management component.

18. A telecommunications circuit provisioning and administration system for providing telecommunications service comprising:

an access request management unit which receives orders for a plurality of different types of telecommunications circuits including special service circuits, the access request management unit including a processor for processing the orders and producing provisioning data packets containing information relating to the orders for telecommunications circuits, each provisioning data packet including at least one order relating to a telecommunications circuit;

an interface connected to the access request management unit for transmitting information to and from the access request management unit, the interface capable of communicating information between a mainframe computer system and a distributed computer system; and a circuit administration unit connected to the interface including:

communications means for receiving the provisioning data packets from the access request management unit through the interface, and a processor for processing the information contained in the provisioning data packets and generating order confirmation messages containing information relating to the status of the orders for telecommunications circuits, the processor further generating automated circuit layout records for telecommunications circuit orders contained in the provisioning data packets, wherein the communications means transmits the order confirmation messages to the access request management unit through the interface.

19. The system as defined in claim 18 wherein the automated circuit layout records comprise computer-generated engineering design records containing design parameters for telecommunications circuits.

20. The system as defined in claim 18 wherein the circuit administration unit processor further generates automated design layout records containing design parameters for a telecommunications circuit order, and wherein the design layout records are communicated to the access request management unit.

21. The system as defined in claim 18 wherein the circuit administration unit communicates the automated circuit layout records to a remote location for implementation of the telecommunications circuit orders in accordance with the circuit layout records.

22. The system as defined in claim 18 wherein the different types of telecommunications circuits include special service circuits, trunk circuits, and facility circuits.

23. The system as defined in claim 22 wherein the special service circuits include telephone circuits and serial circuits.

24. The system as defined in claim 18 wherein each provisioning data packet includes orders relating to a plurality of telecommunications circuits.

25. The system as defined in claim 18 wherein the order confirmation messages indicate whether the telecommunications circuit orders contained in the provisioning data packets have been accepted, or whether errors are present in the provisioning data packets and the nature of the errors.

26. A telecommunications circuit provisioning and administration system for providing telecommunications service comprising:

an access request management unit which receives orders for a plurality of different types of telecommunications circuits, the access request management unit including a processor for processing the orders and producing provisioning data packets containing information relating to the orders for telecommunications circuits, each provisioning data packet including at least one order relating to a telecommunications circuit;

an interface connected to the access request management unit for transmitting information to and from the access request management unit, the interface capable of communicating information between a mainframe computer system and a distributed mid-range computer system; and a circuit administration unit connected to the interface including:

communications means for receiving the provisioning data packets from the access request management unit through the interface, wherein the communications means transmits the order confirmation messages to the access request management unit through the interface, and a processor for processing the information contained in the provisioning data packets and generating order confirmation messages containing information relating to the status of the orders for telecommunications circuits, the processor further generating automated circuit layout records for telecommunications circuit orders contained in the provisioning data packets, wherein the processor includes a plurality of order processors each associated with a different type of telecommunications circuit for processing the information contained in the provisioning data packets and generating the order confirmation messages.

27. The system as defined in claim 26 wherein the order processors determine whether an order relating to a telecommunications circuit requests a new circuit, a change to an existing circuit, or cancellation of an existing circuit.

28. A telecommunications circuit provisioning and administration method for providing telecommunications service, the method comprising:

receiving access service requests for a plurality of different types of telecommunications circuits, including special service circuits, in an access request management system;

processing the requests in the access request management system and producing provisioning data packets containing information relating to the telecommunications circuits ordered in the access service requests;

transmitting the provisioning data packets from the access request management system through an interface capable of exchanging information with the distributed computer system to a circuit administration system that operates on the distributed computer system;

processing the provisioning data packets in the circuit administration system and generating order confirmation messages relating to the status of the telecommunications circuit orders contained in the provisioning data packets;

communicating the order confirmation messages to the access request management system through the interface; and processing the telecommunications circuit orders contained in the provisioning data packets and generating automated circuit layout records for the circuit orders.

29. The method as defined in claim 28 wherein the automated circuit layout records comprise computer-generated design records containing design parameters for the telecommunications circuit orders.

30. The method as defined in claim 28 further comprising:

communicating the automated circuit layout records from the circuit administration system to a remote location for implementation of the telecommunications circuit orders in accordance with the automated circuit layout records;

generating automated design layout records in the circuit administration system containing information relating to the design parameters for the telecommunications circuit orders; and communicating the automated design layout records from the circuit administration system to the access request management system through the interface.

31. The method as defined in claim 28 wherein the step of processing the provisioning data packets determines whether a telecommunications circuit order requests a new circuit, a change to an existing circuit, or cancellation of an existing circuit.

32. The method as defined in claim 28 wherein the order confirmation messages indicate whether the telecommunications circuit orders contained in the provisioning data packets have been accepted, or whether errors are present in the provisioning data packets and the nature of the errors.

33. The method as defined in claim 28 wherein the step of transmitting provisioning data packets further comprises routing the provisioning data packets within the circuit administration system to a plurality of order processors, each of the order processors being associated with a different type of telecommunications circuit for processing the information contained in the provisioning data packets and generating order confirmation messages.

34. A telecommunications circuit administration system for providing telecommunications service, the system operating in conjunction with an access request management system connected to the circuit administration system via an interface, wherein the access request management system receives orders for a plurality of types of telecommunications circuits and produces provisioning data packets containing information relating to the circuit orders, the circuit administration system comprising:

a communications port connected to the interface for receiving the provisioning data packets from the access request management system;

a plurality of order processors each associated with a type of telecommunications circuit for processing the provisioning data packets and generating order confirmation messages containing information relating to the status of the circuit orders;

a first router connected to the communications port for routing the provisioning data packets to the appropriate order processor associated with a particular type of telecommunications circuit;

a second router for transmitting the order confirmation messages from the order processors to the access request management system; and a design processor for processing the circuit orders contained in the provisioning data packets and generating automated circuit layout records containing design parameters for the circuit orders.

35. The system as defined in claim 34 further comprising an output for communicating the automated circuit layout records to a remote location for implementation of the circuit orders in accordance with the circuit layout design records.

36. The system as defined in claim 34 wherein the design processor further generates automated design layout records containing design parameters for the circuit orders which are communicated to the access request management system.

37. The system as defined in claim 34 wherein the types of telecommunications circuits include special service circuits, trunk circuits, and facility circuits.

38. The system as defined in claim 37 wherein the special service circuits include telephone circuits and serial circuits.

39. The system as defined in claim 34 wherein each provisioning data packet includes orders relating to a plurality of telecommunications circuits.

40. The system as defined in claim 34 wherein the order processors determine whether an order for a telecommunications circuit requests a new circuit, a change to an existing circuit, or cancellation of an existing circuit.

41. The system as defined in claim 34 wherein the order confirmation messages indicate whether the circuit orders contained in the provisioning data packets have been accepted, or whether errors are present in the provisioning data packets and the nature of the errors.

42. The system as defined in claim 34 wherein the interface is capable of communicating information between a mainframe computer system and a distributed computer system.

43. The system as defined in claim 42 wherein the circuit administration system operates on the distributed computer system.

44. The system as defined in claim 43 wherein the access request management system operates on the mainframe computer system.

* * * * *